US012809730B2

(12) United States Patent
Krishnamurthy et al.

(10) Patent No.: US 12,809,730 B2
(45) Date of Patent: Nov. 24, 2026

(54) LANE FAILURE REPAIR IN A COMMUNICATION INTERCONNECT

(71) Applicant: NVIDIA Corporation, Santa Clara, CA (US)

(72) Inventors: Adithya Hrudhayan Krishnamurthy, Sunnyvale, CA (US); Ish Chadha, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/954,340

(22) Filed: Nov. 20, 2024

(65) Prior Publication Data

US 2026/0140834 A1 May 21, 2026

(51) Int. Cl.
*G06F 11/20* (2006.01)
*H04L 41/0668* (2022.01)

(52) U.S. Cl.
CPC ...... *G06F 11/2002* (2013.01); *H04L 41/0668* (2013.01)

(58) Field of Classification Search
CPC ............. G06F 11/2002; G06F 2201/85; G06F 11/0793
See application file for complete search history.

(56) References Cited

U.S. PATENT DOCUMENTS

| | | | | |
|---|---|---|---|---|
| 7,622,947 | B1 * | 11/2009 | Danskin | G11C 29/848 326/38 |
| 2015/0052386 | A1 * | 2/2015 | Ahmad | G06F 11/0793 714/6.12 |
| 2015/0278040 | A1 * | 10/2015 | Sikkink | G06F 13/4022 714/5.1 |
| 2016/0380879 | A1 * | 12/2016 | Guduru | H04L 12/40 370/225 |
| 2017/0063449 | A1 * | 3/2017 | Dreps | H04B 10/038 |
| 2017/0307680 | A1 * | 10/2017 | Liang | G01R 31/2851 |
| 2023/0098902 | A1 * | 3/2023 | Desai | G11C 29/38 714/6.11 |
| 2026/0002988 | A1 * | 1/2026 | Mitra | G01R 31/31717 |
| 2026/0079799 | A1 * | 3/2026 | Akavaram | G06F 11/2007 |

* cited by examiner

*Primary Examiner* — Ashish Thomas
*Assistant Examiner* — Catherine Marie Nguyen
(74) *Attorney, Agent, or Firm* — Lowenstein Sandler LLP

(57) ABSTRACT

A device includes a multiple communication lanes including a first portion of lanes and a second portion of lanes, and control logic coupled to the communication lanes. The control logic is to receive an indication that a first lane of the first portion of lanes is damaged, determine a first index of the first lane of the first portion of lanes, determine a second index of a second lane of the second portion of lanes responsive to the indication that the first lane of the first portion of lanes is damaged, convert a first lane mapping of the plurality of communication lanes to a second lane mapping of the communication lanes based on the first index and the second index, and cause first communication data to be transmitted via the communication lanes based on the second lane mapping.

17 Claims, 14 Drawing Sheets

600

| Example 630 | Repair Category 601 | Repair Code 602 | Lane Repaired 603 | Physical Lanes 604 | | | | | |
|---|---|---|---|---|---|---|---|---|---|
| | | | | Repair Lane (RL0) 610 | Data Lane (DL0) 620 | Data Lane (DL1) 621 | Data Lane (DL2) 622 | Data Lane (DL3) 623 | Repair Lane (RL1) 611 |
| First Example 631 | No Repair | 111 (111) | **None** | RL0 | DL0 | DL1 | DL2 | DL3 | RL1 |
| Second Example 632 | Single | 000 (111) | **DL0** | DL0 | XX | DL1 | DL2 | DL3 | RL1 |
| Third Example 633 | Single | 111 (011) | **DL3** | RL0 | DL0 | DL1 | DL2 | XX | DL3 |
| Fourth Example 634 | Double | 000 (001) | **DL0 (DL1)** | DL0 | XX | XX | DL1 | DL2 | DL3 |

FIG. 6

LANE FAILURE REPAIR IN A COMMUNICATION INTERCONNECT

TECHNICAL FIELD

At least one embodiment pertains to processor communications over a channel, such as a datalink. For example, at least one embodiment pertains to lane failure repair in a communication interconnect.

BACKGROUND

In certain communication interconnect systems, such as chip-to-chip (C2C) interconnects, or die-to-die (D2D) interconnects, data transmitted across a channel is often segmented into smaller units, commonly known as "frames," to facilitate efficient data handling. Frames can be encrypted to provide enhanced security for data transmission across the communication interconnect.

BRIEF DESCRIPTION OF DRAWINGS

Various embodiments in accordance with aspects of the disclosure will be described with reference to the drawings, in which:

FIG. 6 is an example table of repair codes generated by the repair module for a communication interconnect, according to some aspects of the disclosure.

DETAILED DESCRIPTION

Figure 1:
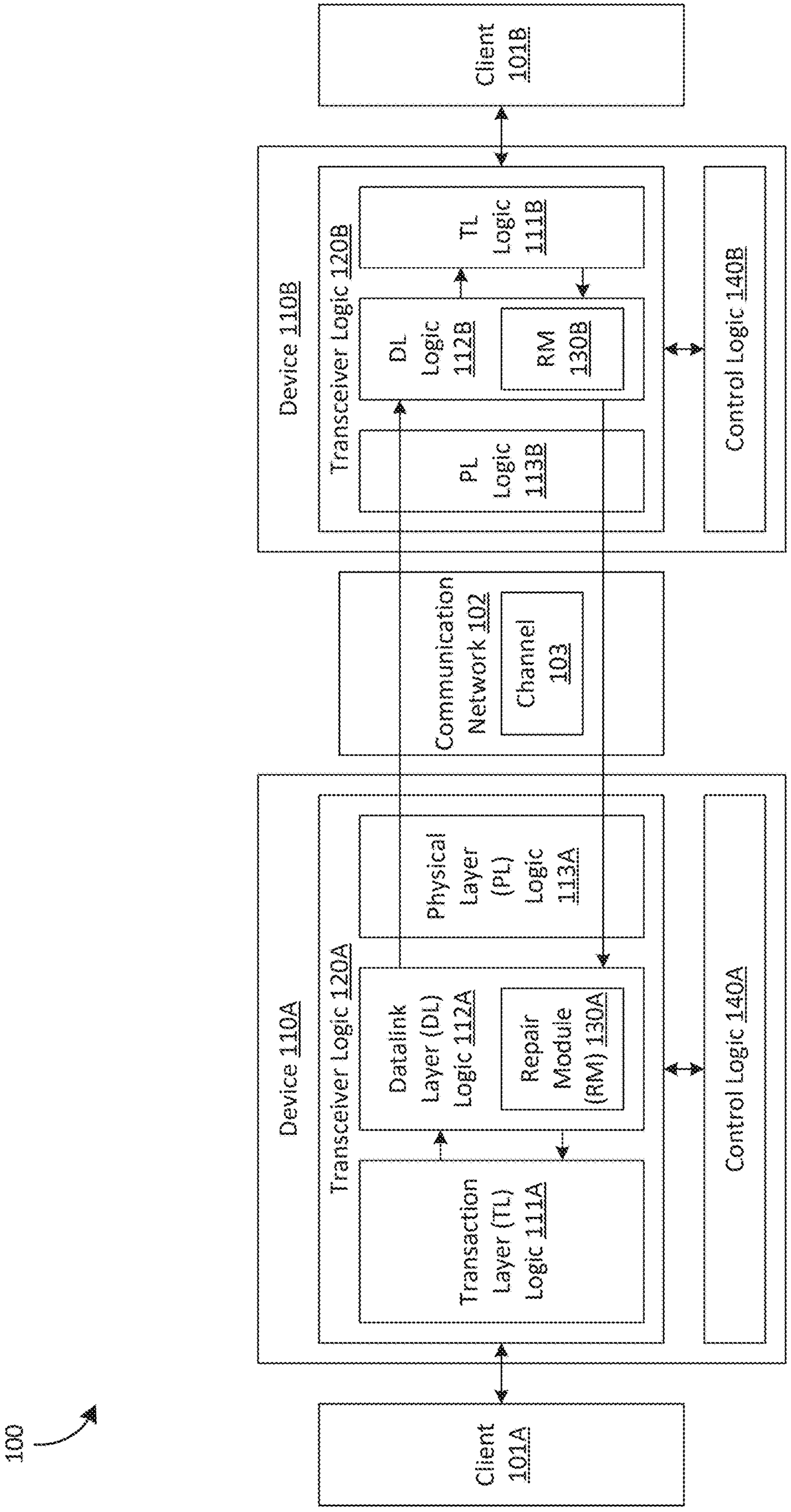
FIG. 1 is a block diagram of an example communication interconnect, according to aspects of the disclosure.

Data can be processed by multiple coupled integrated circuits (ICs) that may each perform different-sometimes specialized-functions. Often these ICs are colloquially referred to as 'chips,' with reference to the final stages of the semiconductor manufacturing process where the ICs (e.g., the chips) are cut from a larger semiconductor wafer. The ICs can be packaged with necessary input/output (I/O) connections, and other circuitry and the resulting apparatus can be referred to as a 'chip.' Thus, a 'communication interconnect' or 'chip-to-chip (C2C) interconnect' can describe an electrical and data coupling (e.g., interconnect) between at least two distinct chips (e.g., ICs). An unpackaged IC that has been cut from a larger semiconductor wafer can be colloquially referred to as a 'die.' Thus, a 'communication interconnect' or 'die-to-die (D2D) interconnect' can describe an electrical and data coupling (e.g., interconnect) between at least two distinct dies (e.g., ICs).

Manufacturing chips or dies for C2C or D2D interconnects or the like, has a high development and production cost. These costs can be minimized by increasing the yield rate of a manufacturing process. The yield rate can be improved in various ways, such as by reducing the circuit footprint on the chips and dies, or improving the likelihood that the manufactured circuit will function as intended. Other cost saving measures can include using partially functional chips as less-performant variants. For example, a chip may be manufactured to have four compute cores, however one of the compute cores may be damaged during manufacturing. If properly designed, the chip may still be used as a three-compute core variant. Another example of a cost-saving measure is binning, where the performance of manufactured chips is tested, and then the manufactured chips are categorized based on certain benchmarks. Due to the complex manufacturing process, chips that are intended to be the same as or similar to each other may actually have significant performance variations. However, because of the high cost to produce these chips, it is advantageous to repurpose lower performing chips whenever possible.

Aspects of this disclosure address these and other challenges by implementing lane failure repair in a communication interconnect. During manufacturing, additional lanes are added to the communication interconnect. During post-manufacturing tests, if the communication interconnect fails a quality control test due to damaged interconnect lanes, the damaged lanes can be "repaired" using the additional lanes. The additional lanes are logically reidentified as lanes in the communication interconnect, and the lanes of the communication interconnect are re-indexed, as necessary. The damaged interconnect lanes, while physically still present, are logically disconnected from the interconnect. The communication interconnect can use the now-repaired communication interconnect (which now contains the additional lane(s)) as if no damage had occurred to the interconnect during manufacturing.

Advantages of the disclosure include, but are not limited to, an increased wafer yield for interconnect chips, increased dataflow across otherwise damaged or reduced bandwidth communication interconnects, and improved reliability of the communication interconnect.

FIG. 1 is an example block diagram of a communication interconnect 100, according to some aspects of the disclosure. The communication interconnect 100 includes a client 101A coupled to a device 110A and a client 101B coupled to a device 110B. The device 110A and the device 110B are coupled together via the communication network 102 to transmit and receive data. In some embodiments, the transmitted and received data is in a data frame.

Device 110A includes transceiver logic 120A coupled to a control logic 140A. Similarly, device 110B includes transceiver logic 120B coupled to a control logic 140B. The transceiver logic 120A includes transaction layer (TL) logic 111A, datalink layer (DL) logic 112A, and physical layer (PL) logic 113A. Similarly, the transceiver logic 120B includes TL logic 111B, DL logic 112B, and PL logic 113B. The function and operation of the device 110A described herein similarly apply to the function and operation of the device 110B unless explicitly noted.

In some embodiments, the client 101A is an integrated circuit of a Personal Computer (PC), a laptop, a tablet, a smartphone, a server, a collection of servers, or the like. In some embodiments, the client 101A may correspond to any appropriate type of device that communicates with other devices also connected to a common type of communication network 102.

The device 110A can be an integrated circuit of a graphics processing unit (GPU), a switch (e.g., a high-speed network switch), a network adapter, a central processing unit (CPU), a data processing unit (DPU), a neural processing unit (NPU), an application-specific integrated circuit (ASIC), a field programmable gate array (FPGA), a network interface card (NIC), or the like. The device 110A can be implemented in components in clients referred to as machines, computers, servers, network devices, or the like (e.g., client 101A).

The communication interconnect 100 allows the client 101A to communicate with the client 101B via the communication network 102 and devices 110A-110B, respectively. The client 101A can cause the device 110A to transmit and receive data with the client 101B (or another client coupled to the communication network 102 via another respective device) via the channel 103. Similarly, the client 101B can cause the device 110B to transmit and receive data across the communication network 102.

Examples of the communication network 102 that may be used to connect the device 110A and device 110B include wires, conductive traces, bumps, terminals, optical fibers, or the like. In other embodiments, the communication network 102 can be a Peripheral Component Interconnect Express (PCIe) interconnect. PCIe is a high-speed interface standard used to connect various hardware components. It can be an interconnect for devices such as graphics cards (GPUs), solid-state drives (SSDs), network cards, and other peripherals. PCIe offers a scalable, high-speed, and point-to-point connection between devices, including CPUs, GPUs, memory, and the like. In other embodiments, the communication network 102 can be a high-speed interconnect, such as an interconnect that deploys the NVLink technology. The NVLink interconnect can be a GPU-GPU interconnect used between GPUs, a CPU-GPU interconnect between GPUs and CPUs, or an interconnect used between other devices. NVLink offers a higher bandwidth and lower latency than traditional PCIe connections, which are typically used in computing hardware. NVLink is especially useful in scenarios that require massive parallel processing, such as artificial intelligence (AI), machine learning, deep learning, high-performance computing (HPC), and data analytics. For example, in NVIDIA's DGX systems and high-end gaming or AI workstations, NVLink helps GPUs exchange data at speeds that are necessary for demanding tasks like real-time ray tracing or training neural networks. In one specific, but non-limiting example, the communication network 102 is a network that enables data transmission between the device 110A and device 110B using data signals (e.g., digital, optical, wireless signals), clock signals, or both.

The embodiments described herein can be utilized in a system with a high-speed, scalable switch, such as a switch using the NVSwitch technology. NVSwitch is a high-speed, scalable switch developed by NVIDIA that facilitates data communication between multiple GPUs in a system, allowing them to work together more efficiently by providing high-bandwidth, low-latency interconnections. The NVSwitch serves as a central hub or high-bandwidth fabric that interconnects all the GPUs in a system, enabling each GPU to communicate with every other GPU quickly and efficiently. The NVSwitch can be coupled between other types of devices, such as CPUs, accelerators, memory, or the like. The NVSwitch can be used for tasks requiring intense computation and collaboration between multiple GPUs, such as AI model training, scientific simulations, and large-scale data processing. The embodiments described herein can be used in a high-performance computing system, such as a computing system modeled after NVIDIA's DGX systems, which are designed specifically for artificial intelligence (AI), deep learning, and high-performance computing (HPC) workloads. DGX systems are optimized for large-scale GPU computation and parallel processing, integrating multiple GPUs, high-bandwidth interconnects, and software frameworks tailored for AI and HPC tasks. In at least one embodiment, a system for high-speed network communication includes a processing unit, a network interface comprising a receiver or transceiver with the control logic, as described herein.

Other examples for the communication network 102 can include other chip-to-chip or die-to-die interconnects, such as GRS, LPI (low power interface) or LLI (low latency interface).

In embodiments, the device 110A can interface with the client 101A to transmit and receive data over a two-way communication stream (e.g., channel 103 of the communication network 102). The channel 103 can be PCIe, NVLink, Ethernet, InfiniBand, Ground Reference Signal (GRS), C2C, D2D, or the like. As illustrated, device 110A is single device which includes transceiver logic 120A (and device 110B respectively includes the transceiver logic 120B). The transceiver logic 120A can be used to send and receive data signals via the communication network 102. In some embodiments, the device 110A can include a transceiver device, transmitter device, or receiver device, which may include some or all of the transceiver logic 120A.

The transceiver logic 120A includes suitable software, firmware, and/or hardware for receiving digital data from a source (e.g., client 101A) and outputting data signals according to the digital data for transmission over the communication network 102. In some embodiments, the transceiver logic 120A can generate and transmit frames including data from the client 101A over the communication network 102 to the device 110B. For example, the transceiver logic 120A can generate and transmit frames across the channel 103 to the device 110B.

The transceiver logic 120A also includes suitable software, firmware, and/or hardware for receiving digital data from a device over the communication network 102 and outputting digital data for further processing by a recipient (e.g., client 101A). For example, the transceiver logic 120A may include components for receiving processing signals to extract the data for storing in a memory. In some embodiments, the transceiver logic 120A can receive and process frames including data from the client 101A over the communication network 102 from another device 110B. For example, the transceiver logic 120B can receive and process frames including data from the client 101A across the channel 103 from the device 110B. In some embodiments, the transceiver logic 120A receives an incoming signal and samples the incoming signal to generate samples, such as using an analog-to-digital converter (ADC).

The transceiver logic 120A includes multiple processing elements, such as one or more of transaction layer logic 111A, datalink layer logic 112A, or physical layer logic 113A, as illustrated. Similarly, the transceiver logic 120B of the device 110B can include corresponding processing elements such as TL logic 111B, DL logic 112B, and PL logic 113B, as illustrated. The transceiver logic 120A or selected elements of the device 110A may take the form of a pluggable card or respective controller for the device 110A. For example, the transceiver logic 120A or selected elements of the device 110A may be implemented on a network interface card (NIC). In an alternative example, the functions of the transceiver logic 120A can be performed by separate devices of the communication interconnect 100. For example, a first device can include the transaction layer logic 111A, a second device can include the datalink layer logic 112A, and a third device can include the physical layer logic 113A.

The transaction layer logic 111A can interface directly with the client 101A. The transaction layer logic 111A can receive data from the client (e.g., "client data") that is to be transmitted across the communication network 102. In some embodiments, the transaction layer logic 111A can divide the data received from the client into predetermined quantities. For example, data received from the client 101A may be several kilobytes of data, and the transaction layer logic 111A can break the data down into evenly sized chunks of one byte each. Additional predetermined "chunk" sizes or data quantities are considered.

The datalink layer logic 112A can receive the predetermined quantity of data from the transaction layer logic 111A. The datalink layer logic 112A can package the received data into a frame to be transmitted across the communication network 102. In some embodiments, a frame of data includes the quantity of data (e.g., one byte of data). In some embodiments, the datalink layer logic 112A includes a repair module (RM) 130A for converting a damaged lane mapping into a repaired lane mapping.

The physical layer logic 113A interfaces directly with the communication network 102 to transmit data across the communication network 102 to the device 110B, where the PL logic 113B provides the received data to the DL logic 112B. The DL logic 112B uses the RM 130B to convert a repaired lane mapping back to a damaged lane mapping (e.g., the original lane mapping that the receiving device is "expecting"). The TL logic 111B can provide the received data to the client 101B.

The repair module 130A of the device 110A is illustratively in the datalink layer logic 112A. In some embodiments, the repair module 130A can be separate from the datalink layer logic 112A as another component of the transceiver logic 120A or the device 110A.

When a communication lane (e.g., of the channel 103) is damaged, the repair module 130A can perform, or cause to be performed, one or more mitigating operations to "repair" the channel 103 to full functionality. In some embodiments, the repair module 130A can determine that one of the communication lanes of the channel 103 is damaged. In alternative embodiments, another component of the device 110A can determine that a portion of the channel 103 (e.g., a communication lane) is damaged and provide an indication of the damaged portion of the channel 103 to the repair module 130A.

The repair module 130A can use information about a damaged portion of the channel 103 to generate a repair code. The repair code can be used to generate a repair mapping. In the repair mapping, the logical identity (e.g., logical index) of a particular communication lane can be reassigned to another physical communication lane. For example, given logical lane_1 at physical index_1 and logical lane_2 at physical index_2, the repair module can reassign the logical lane_1 to the physical index_2. In some embodiments, this lane mapping, or repaired lane mapping, is not known outside of the component that includes the repair module 130A. For example, in FIG. 1, the datalink layer logic 112A includes the repair module 130A; thus, when the repair module 130A has repaired the channel 103, the transceiver logic 120A can operate as if the logical lane_1 is assigned to the physical index_1, instead of truly being assigned to the physical index_2.

In order to communicate with the device 110B, some component (here RM 130B of the device 1101B) can convert data signals sent over the physical lanes of the channel 103 (e.g., from the physical layer logic 113A through the PL logic 113B) into logical lanes for the transceiver logic 120B of the device 110B. The RM 130B of the device 110B can use the repair code generated by the repair module 130A of the device 110A (or a repair code similarly generated at the RM 130B) to map the physical lanes of the channel 103 to the logical lanes of the channel 103. In some embodiments, the repair module 130A can include or access a data store which stores the original, damaged, and/or repaired lane mappings for the device 110A. In some embodiments, the repair module 130A can store generated repair codes at the data store. Additional details regarding the repair module 130A are described below with reference to FIGS. 3-7.

The control logic 140A of the device 110A (and similarly, the control logic 140B of the device 110B) can be used to control the transceiver logic 120A of the device 110A (or transceiver logic 120B of the device 110B, respectively). The control logic 140A can cause the device 110A to perform one or more functions, such as transmitting and receiving data signals over the communication network 102. In some embodiments, the control logic 140A causes the transceiver logic 120A to transmit a data signal and/or receive a data signal over the communication network 102.

The control logic 140A may comprise software, hardware, or a combination thereof (such as a controller hardware component or the like). For example, the control logic 140A may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the control logic 140A may comprise hardware, such as an Application-Specific Integrated circuit (ASIC). Other non-limiting examples of the control logic 140A include an Integrated Circuit (IC) chip, a CPU, A GPU, a DPU, a microprocessor, a Field-Programmable Gate Array (FPGA), a collection of logic gates or transistors, resistors, capacitors, inductors, diodes, or the like. Some or all of the control logic 140A may be provided on a Printed Circuit Board (PCB) or collection of PCBs. It should be appreciated that any appropriate type of electrical component or collection of electrical components may be suitable for inclusion in the control logic 140A. The control logic 140A may send and/or receive signals to and/or from other elements of the device 110A to control the overall operation of the device 110A.

In embodiments, the control logic 140A can include the repair module 130A. The repair module 130A can perform the operations described above from the control logic 140A to generate repaired lane mappings and enable communication between damaged lane mappings of the device 110A and the device 110B. The repair module 130A can include processing circuitry or hardware used to perform operations of the repair module 130A (e.g., generation of repaired lane mappings, conversion of damaged lane mappings to repaired lane mappings, and the like).

Figure 2:
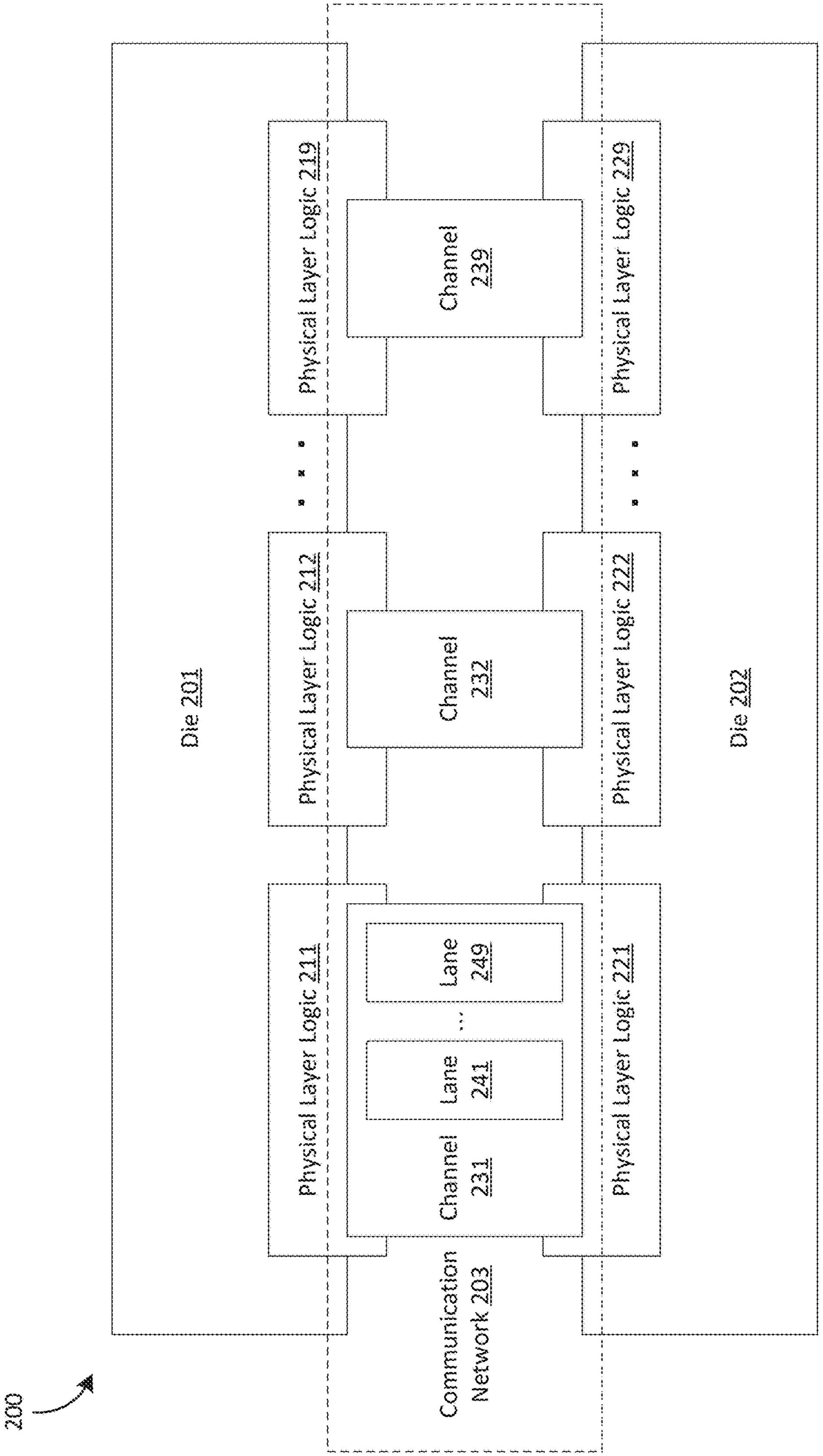
FIG. 2 is an example block diagram of a communication device in a communication interconnect, according to some aspects of the disclosure.

FIG. 2 is a block diagram of an example of a communication interconnect 200, according to some aspects of the disclosure. The communication interconnect 200 connects a die 201 to a die 202 by the communication network 203.

The die 201 includes physical layer logic 211, and physical layer logic 212 through physical layer logic 219. Die 202 similarly includes physical layer logic 221, and physical layer logic 222 through physical layer logic 229. In some embodiments, each physical layer logic of each die can be a group of physical connectors, such as physical conductive pads or traces. Physical layer logic 211 is connected to physical layer logic 221 via channel 231, physical layer logic 212 is connected to physical layer logic 222 via channel 232, and physical layer logic 219 is connected to physical layer logic 229 via channel 239. It can be appreciated the multiple channels of the communication network 203 (beyond the three illustrated here) can connect the die 201 to the die 202.

Channel 231 includes lane 241 and lane 249. Channel 232 and channel 239 can similarly include lanes. If one of the lanes (e.g., lane 241 through lane 249) of the channel 231 is damaged, the functionality of the channel 231 is reduced. In some embodiments, the channel 231 is still used, albeit at a lower speed, bandwidth, data throughput, or the like.

A repair module is used to repair the channel 231 through remapping of lanes in the channel 231 (e.g., lane 241 through lane 249). In some embodiments, when the repair is successful, the channel 231 can function like the channel 232 (e.g., another channel where no lanes are damaged).

Figure 3A:
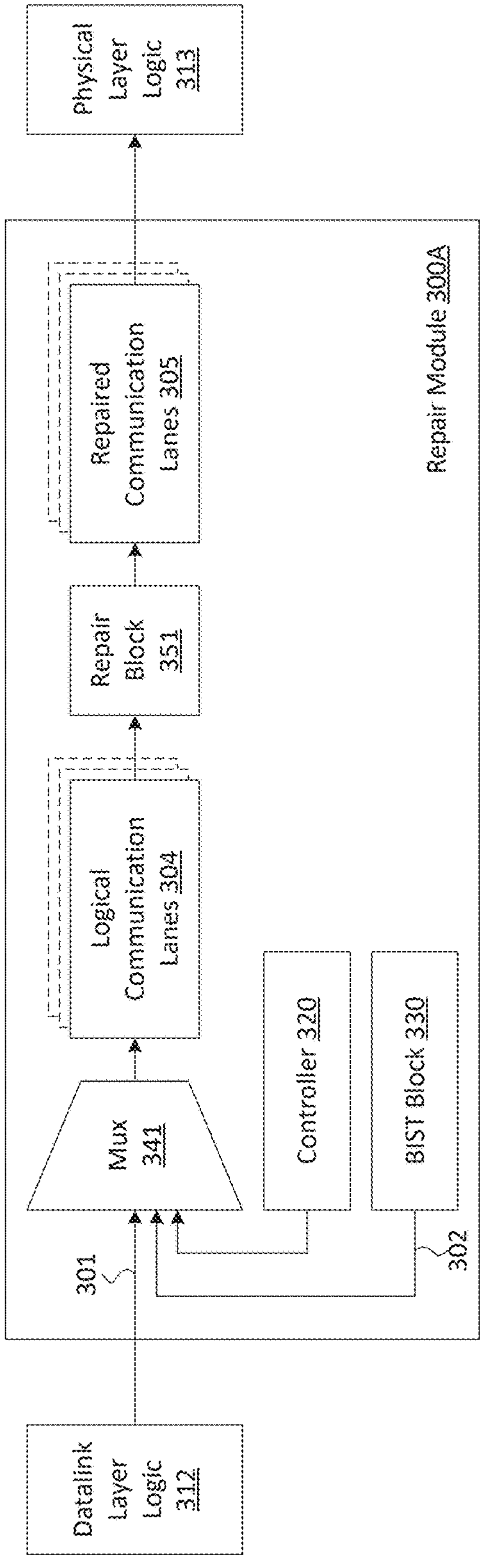
FIG. 3A is a block diagram illustrating a repair module, according to some aspects of the disclosure.

FIG. 3A is a block diagram illustrating a repair module 300A, according to some aspects of the disclosure. The repair module 300A includes a controller 320, a built-in self-test (BIST) block 330, a multiplexer, mux 341, and a repair block 351. The repair module 300A interfaces with the communication lanes of a channel (e.g., lanes 241 through 249 of channel 231 described with reference to FIG. 2). The repair module 300A receives an input from the datalink layer logic 312 and provides an output to the physical layer logic 313.

The logical communication lanes 304 and repaired communication lanes 305 illustrated in FIG. 3A are not necessarily representative of separate sets of communication lanes, but rather illustrated representations of separate lane mappings. For example, communication lanes can be damaged, resulting in a lane mapping of logical lanes to physical lanes that does not operate at a full logical capacity for the datalink layer logic 312. This limited functionality of the communication lanes can be referred to as logical communication lanes 304. Similarly, after the repair block 351 remaps the communication lanes, they can be referred to as repaired communication lanes 305. In some embodiments, the repair block 351 is physically inserted between two sets of communication lanes as illustrated. For example, the repair block 351 can be inserted near a location where lane damage is more likely to occur prior to the repair block (e.g., physically between the datalink layer logic 312 and the repair block 351).

The datalink layer logic 312 generates a data signal (sometimes as one or more frames) to be sent across a communication network via the physical layer logic 313. This data signal 301 is used as input to the mux 341. The controller selects from the data signal 301 and the BIST signal 302. The output of the mux 341 is sent via logical communication lanes 304. The repair block 351 interfaces with the logical communication lanes 304 to generate a new lane mapping. In some embodiments, the repair block generates a repair code that is used to map the logical communication lanes 304 to the repaired communication lanes 305. That is, the repair block generates a lane mapping of functioning, non-damaged physical lanes to logical communication lanes, which are sent to the physical layer logic 313 as repaired communication lanes 305. As illustrated, the repair block 351 physically divides a respective first portion of the communication lanes from a respective second portion of the communication lanes, however, as previously described, in some embodiments, the repair block can implement the new lane mapping by other methods. For example, the repair block may be connected to the output of the mux 341 or similar.

The BIST block 330 can include one or more built-in self-tests in the form of software, hardware, or firmware. The repair module 300A (or the device that includes the repair module 300A) can use the BIST block 330 to determine whether one or more communication lanes are damaged. In some embodiments, the results of a test performed by the BIST block 330 can indicate which lanes are damaged and which lanes are not damaged. In some embodiments, tests performed by the BIST block 330 are enabled by the repair module 300A during manufacturing of the device that includes the repair module 300A. In some embodiments, the tests performed by the BIST block 330 are enabled by an external command, such as a command received through a configuration or debugging module of the device (not illustrated).

Figure 3B:
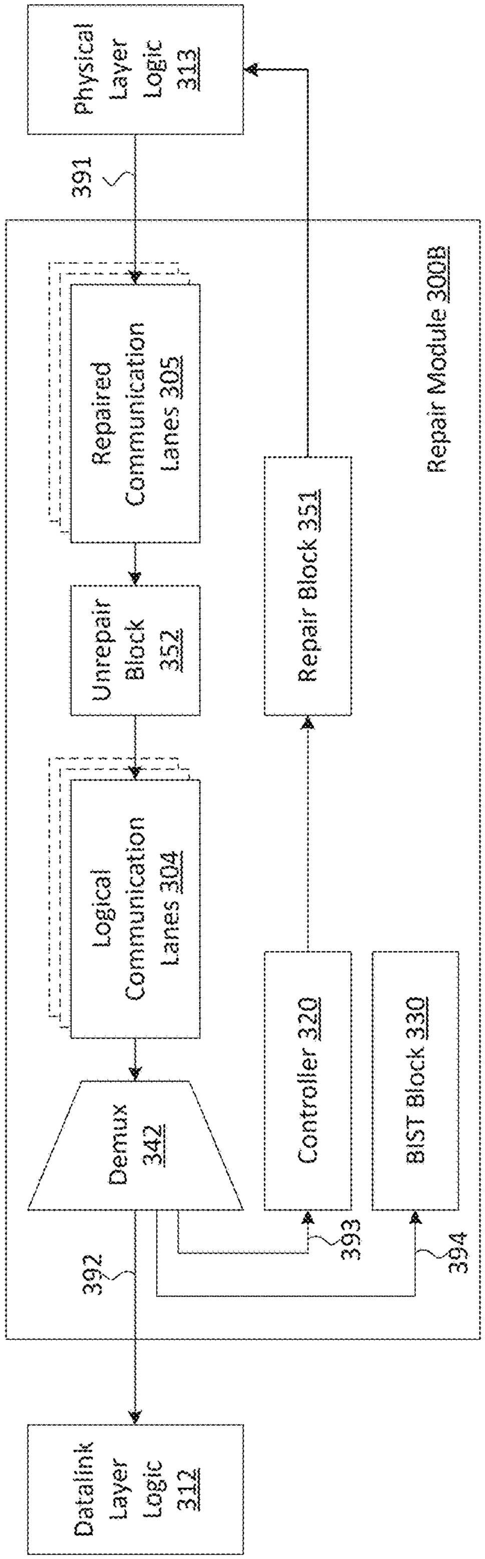
FIG. 3B is a block diagram illustrating a repair module, according to some aspects of the disclosure.

FIG. 3B is a block diagram illustrating a repair module 300B, according to some aspects of the disclosure. The repair module 300B includes a controller 320, BIST 330, a multiplexer, mux 341, a repair block 351, and an unrepair block 352. The repair module 300B interfaces with the communication lanes of a channel (e.g., lanes 241 through 249 of channel 231 described with reference to FIG. 2). The repair module 300B receives an input from the physical layer logic 313 and provides an output to the datalink layer logic 312.

As described above with reference to FIG. 3A, the logical communication lanes 304 and repaired communication lanes 305 illustrated in FIG. 3B are not necessarily representative of separate sets of communication lanes.

The repair module 300B receives a data signal 391 from a communication network via physical layer logic 313. The data signal 391 is transmitted according to a lane mapping for repaired communication lanes 305. Notably, the lane mappings are generated for pairs of connected devices. That is, the lane mapping generated and implemented by repair block 351 at a first device (e.g., described in FIG. 3A) is for the connection between the first device and a second device, and the same lane mapping is implemented by the repair block 351 at the second device (e.g., described in FIG. 3B).

At the unrepair block 352, the lane mapping for the repaired communication lanes 305 is converted to the lane mapping for the logical communication lanes 304. The unrepair block 352 can use the same repair code generated at the repair block of the sending device (e.g., as described in FIG. 3A) to change the lane mapping from the repaired lane mapping to the damaged lane mapping. The logical communication lanes 304 provide the signal to a demultiplexer, demux 342, which separates the data received from the communication network into various data signals. As illustrated, data signal 392 is sent to the datalink layer logic for further processing; data signal 393 is sent to the controller 320, and data signal 394 is sent to BIST 330. The controller 320 parses the communication data to obtain repair codes, which are then verified at the repair block 351. In some embodiments, the repair block 351 can be updated based on the repair codes extracted from received data. In some embodiments, the repair block 351 extracts the repair codes from the received data, which are then provided to the unrepair block 352. It can be appreciated that in some embodiments, this feedback loop that provides a portion of the communication data back to a repair block and back through the repair module is what enables the unrepair block 352 to perform the functions of generating the new lane mapping for the logical communication lanes 304 based on the communication data transmitted via the lane mapping for the repaired communication lanes 305.

Figure 4:
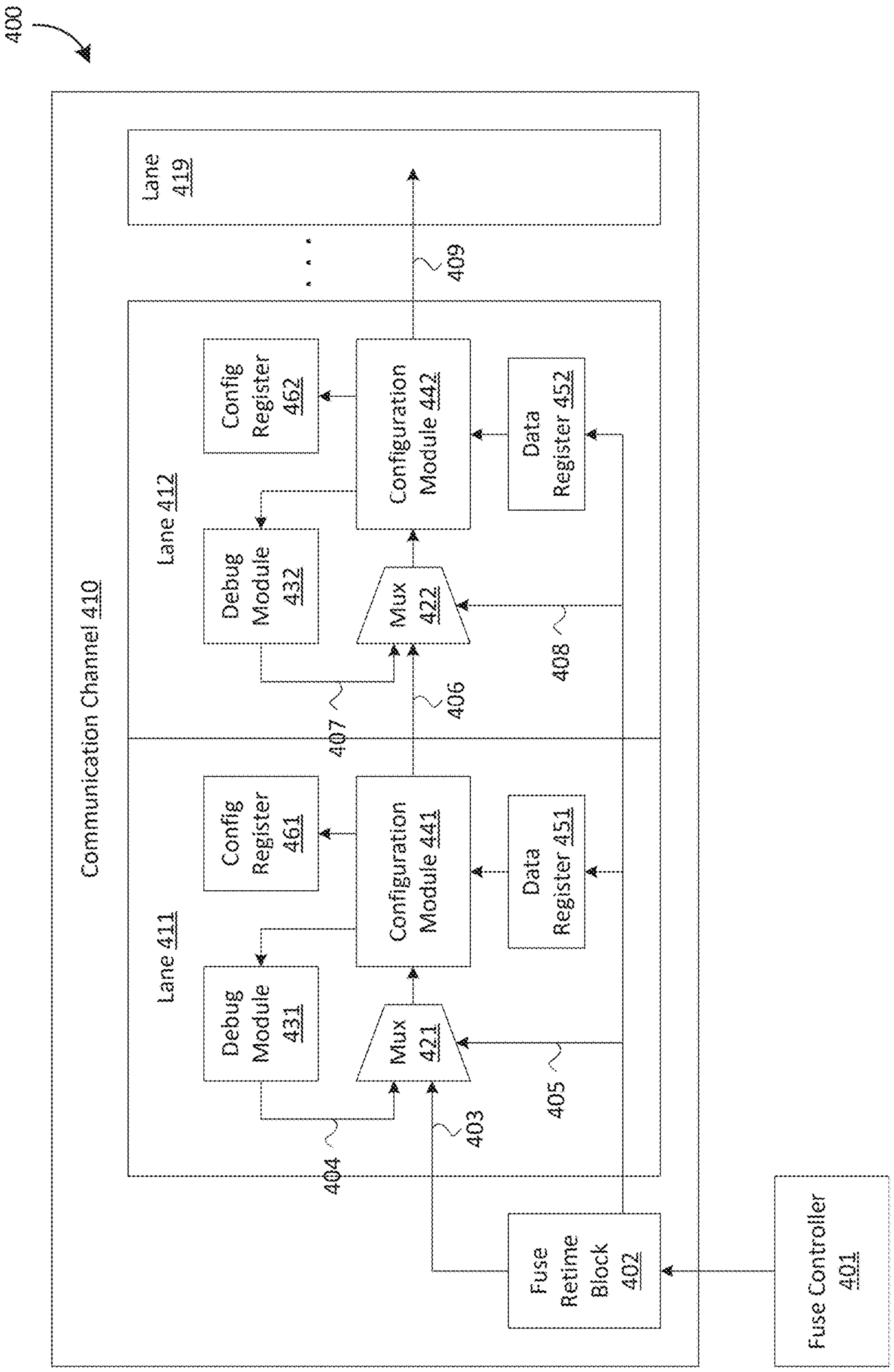
FIG. 4 is a block diagram illustrating how a communication channel receives and implements a lane repair, according to some aspects of the disclosure. The communication channel interfaces with a fuse controller.

FIG. 4 is a block diagram 400 illustrating how a communication channel 410 receives and implements a lane repair, according to some aspects of the disclosure. The communication channel 410 interfaces with a fuse controller 401.

The fuse controller 401 can include indications of damaged lanes for a device. In some embodiments, these indications are stored in the form of a burnt fuse. Once the fuse is burnt, the trace containing the burnt fuse is no longer enabled to conduct electricity across the burnt fuse. This permanent indication can provide a lasting indication of manufacturing damage or defects of the device (e.g., to a portion of a communication channel between two chips). In some embodiments, the fuse controller 401 can burn fuses corresponding to lanes of the communication channel 410 (e.g., lane 411, and/or lane 412 through lane 419) after determining which of the lanes are damaged or defective. After the fuse is initially burned, the fuse controller is configured to automatically generate an output indicating which fuses are burnt and which fuses are not burnt.

The communication channel 410 interfaces with the fuse controller 401. In some embodiments, the communication channel includes multiple lanes (e.g., lane 411, and lane 412 through lane 419) that are coupled to a fuse retime block 402. The fuse retime block 402 can perform one or more operations on the output signal of the fuse controller 401 to synchronize the output signal to communication channel clock signals, or respective clock signals of the lane 411, and lane 412 through lane 419.

Each lane includes many of the same or similar components. Lane 411 is described herein, but the description of lane 411 similarly applies to lane 412 and lane 419 (elements not illustrated).

Lane 411 includes a mux 421, a debug module 431, a configuration module 441, a data register 451, and a config register 461. Values stored in the config register 461 are set by the configuration module 441 based on inputs to the configuration module 441 from the mux 421 and the data register 451. Values stored in the config register 461 can indicate whether the lane is damaged, and what logical lane is assigned to the respective physical lane (e.g., lane 411, or lane 412 through lane 419).

In some embodiments, the repair code is received at the configuration module via the mux 421. The repair code can be provided to the mux 421 by the fuse controller 401 in combination with the fuse retime block 402 as signal 403, or from the debug module 431 as signal 404. The signal 403 received from the fuse controller can indicate which fuses are burnt as an indication of the repair code. In some embodiments, the signal 404 is provided from an external source, such as to program a specific lane mapping to the communication channel 410 or to perform one or more tests on the communication channel 410, such as during manufacturing of the device which includes this portion of the communication channel 410.

The mux 421 operates based on a control signal, signal 405 received from the fuse retime block 402. In some embodiments, the timing of the signal 405 is the same as the timing of the signal 403. That is, the signal 405 and the signal 403 are synchronized in time. In alternative embodiments, the timing of the signal 405 and is different from the timing of the signal 403. That is, the signal 405 and the signal 403 are not synchronized in time.

The mux 421 can select either the signal 403 or the signal 404 based on the control signal 405. The resulting output of the mux 421 is used as input to the configuration module 441. In some embodiments, the configuration module 441 can implement a joint test action group (JTAG) interface. The JTAG interface can be used directly during manufacturing or testing of the device that includes this portion of the communication channel 410.

As described above, the debug module 431 can be used to provide a direct input to the repair module associated with the communication channel 410 during testing. In another example, the debug module 431 can receive a manual configuration for the lane mapping of lane 411 and lane 412 through lane 419.

In some embodiments, the configuration module 441 can determine based the signal received from the mux 421, whether the lane 411 is a damaged lane. If the lane 411 is a damaged lane, the configuration module 441 can reassign the logical lane associated with lane 411 to another physical lane (e.g., a repair lane). This reassignment and indication of whether or not the lane is damaged can be stored in the config register 461. That is, the config register 461 can indicate whether the lane 411 is damaged, and what logical lane is assigned to the lane 411, whether or not the lane 411 is damaged. In alternative embodiments, the config register 461 can indicate which lane the logical lane associated with lane 411 has been assigned to. That is, the config register 461 can indicate to which physical lane (e.g., lane 412 through lane 419) the logical lane previously associated with lane 411 has been assigned. In some embodiments, if the lane 411 is not damaged, the configuration module 441 can determine whether the logical lane assigned to the lane 411 (e.g., the physical lane) for the incoming communication data is the logical lane that the device receiving the incoming communication data is expecting. For example, if a physical lane is damaged, logical lanes may be shifted by one physical lane across the multiple logical lanes, resulting in multiple logical lanes being assigned to different physical lanes (e.g., lane 411 and lane 412 through lane 419).

The data register 451 can be used to buffer the input to the configuration module 441. In some embodiments, the data register 451 is implemented in the lane 411 to provide JTAG functionality to the configuration module 441.

The configuration module 441 can further provide an output signal, signal 406, to the mux 422 of the lane 412. The mux 422 receives the signal 406 from the configuration module 441 (e.g., the configuration module of the previous, or adjacent lane) and a signal 407 from a debug module 432 of the lane 412. The mux 422 is controlled similarly to the mux 421 by a control signal, signal 408. In some embodiments, the control signal 408 and the control signal 405 can be the same signal. The mux 422 provides an output (selected based on the signal 408) to the configuration module 442. The configuration module can perform the same or similar function as the configuration module 441, described above, to store one or more values in the config register 462 of the lane 412. The configuration module 442 of the lane 412 can pass an output signal 409 to a subsequent or adjacent lane (e.g., a lane between the lane 412 and the lane 419).

The data register 452, similar to the data register 451, can be used to buffer the input to the configuration module 442. In some embodiments, the data register 452 is implemented in the lane 412 to provide JTAG functionality to the configuration module 442.

Figure 5A:
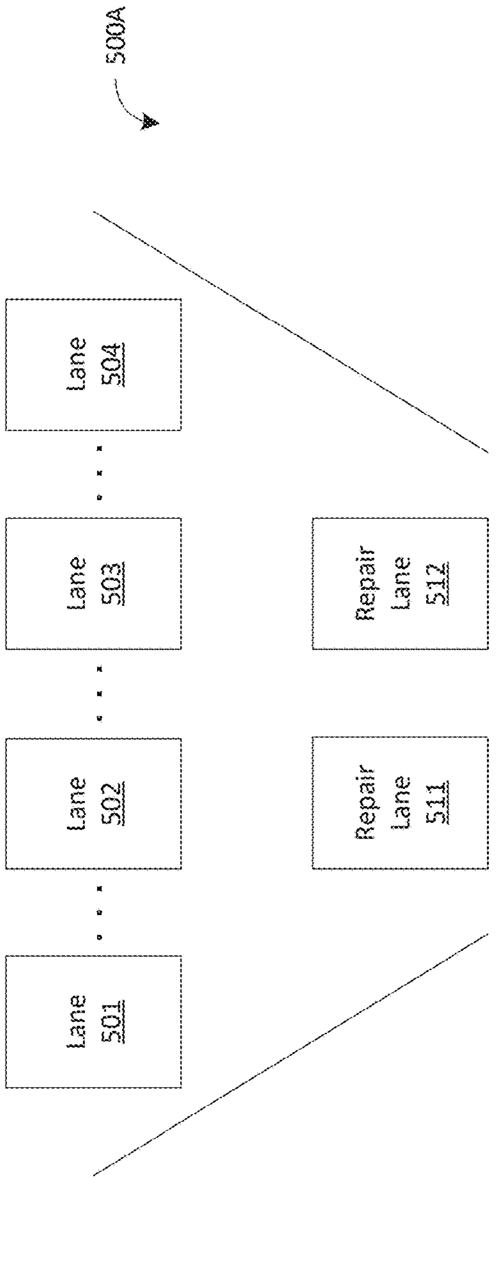
FIG. 5A is a block diagram illustrating how repair lanes can be used to reassign logical lanes associated with damaged physical lanes of a repairable communication interconnect to respective repair lanes, according to aspects of the disclosure.

FIG. 5A is a block diagram illustrating how repair lanes can be used to reassign logical lanes associated with damaged physical lanes of a repairable communication interconnect 500A to respective repair lanes, according to aspects of the disclosure.

The repairable communication interconnect 500A can be manufactured with any number of lanes necessary for operation of the repairable communication interconnect 500A. Here, four lanes are illustrated, lane 501, lane 502, lane 503, and lane 504. The repairable communication interconnect 500A can further include one or more repair lanes, here the repair lane 511 and the repair lane 512. Each lane (e.g., lane 501, lane 502, lane 503, and lane 504) are manufactured to transmit and/or receive communication data across the repairable communication interconnect 500A. Thus, each lane is associated with a logical lane, or a specific portion of data transmission and reception for the repairable communication interconnect 500A.

As described above, some lanes may be damaged during manufacturing. For this reason, additional physical lanes, here illustrated as repair lane 511 and repair lane 512, are also manufactured in the interconnect 500A. In the event that one of the communication lanes associated with a logical lane is damaged during manufacturing, a new lane mapping can be generated for the repairable communication interconnect 500A that incorporates the undamaged extra physical lanes (e.g., the repair lane 511 and the repair lane 512).

In FIG. 5A, a physical and logical schema for remapping repair lane 511 and repair lane 512 to any of the damaged lanes (e.g., one or more of the lane 501, lane 502, lane 503, or lane 504) is illustrated. In some embodiments, the logical lane of a particular damaged lane can be remapped to one of the repair lanes. For example, if the lane 502 is damaged, the logical lane associated with the lane 502 can be remapped arbitrarily to the repair lane 511 or the repair lane 512. In alternative embodiments, the repair lanes are manufactured at the physical edges of the communication lanes. That is, a first repair lane (e.g., repair lane 511) may be physically adjacent to a first communication lane (e.g., lane 501), and a second repair lane (e.g., repair lane 512) may be physically adjacent to a last communication lane (e.g., lane 504). When the repairable communication interconnect 500A is "repaired" a repair module may reassign logical lanes to adjacent physical lanes. Thus, in such alternative embodiments, the repair module may assign the logical lane associated with the damaged lane 501 to the physically adjacent repair lane 511. In another example if the lane 502 is damaged, the repair module may assign the logical lane associated with the non-damaged lane 501 to the repair lane 511, and the logical lane associated with the damaged lane 502 to the lane 501. In this way, the assignment of the logical lanes to physical lanes can be shifted by however many damaged lanes (and corresponding repair lanes) are present in the repairable communication interconnect 500A.

Figure 5B:
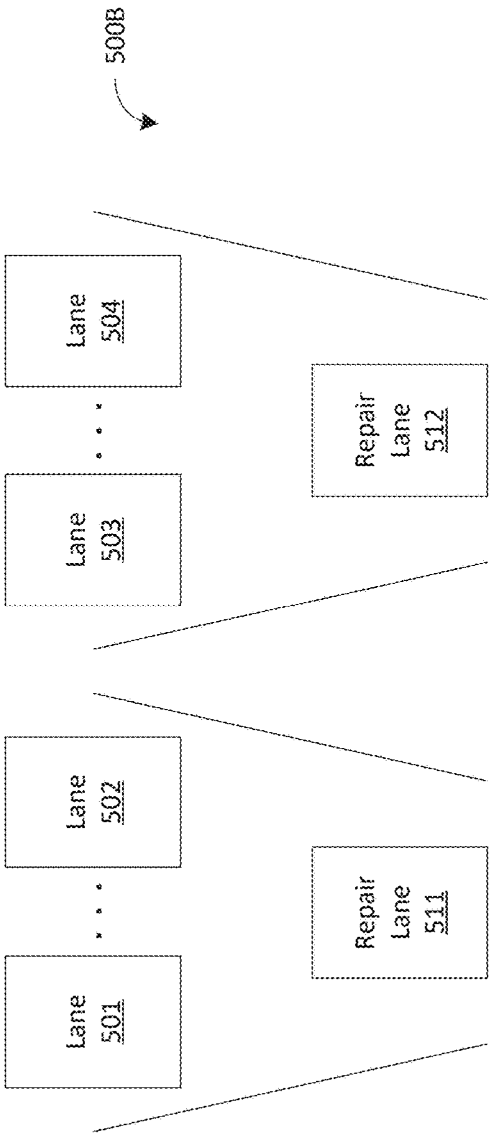
FIG. 5B is a block diagram illustrating how repair lanes can be used to reassign logical lanes associated with damaged physical lanes of a repairable communication interconnect to respective repair lanes, according to aspects of the disclosure.

FIG. 5B is a block diagram illustrating how repair lanes can be used to reassign logical lanes associated with damaged physical lanes of a repairable communication interconnect 500B to respective repair lanes, according to aspects of the disclosure.

In the repairable communication interconnect 500B, each repair lane is configured to be used by only a portion of the communication lanes. For example, as illustrated, repair lane 511 is configured to be used to repair lane 501 and lane 502 and repair lane 512 is configured to be used to repair lane 503 and lane 504. In the repairable communication interconnect 500B, logical lanes can be reassigned from damaged lanes to respective repair lanes as is described with reference to FIG. 5A, however, with the caveat that the repair lanes can only be used for specific communication lanes (e.g., repair lane 511 used to repair lane 501 or lane 502, and repair lane 512 used to repair lane 503 or lane 504).

The alternative configuration of the repairable communication interconnect 500B may reduce the number of components to implement the repairable communication interconnect 500B, reduce the footprint of the circuitry to implement the repairable communication interconnect 500B, or provide other improvements over the configuration of the repairable communication interconnect 500A of FIG. 5A.

FIG. 6 is an example table 600 of repair codes generated by the repair module for a communication interconnect, according to some aspects of the disclosure.

The example table 600 includes columns for a repair category 601, a repair code 602, a lane repaired 603, and physical lanes 604. These columns are for illustrative purposes and a device that repairs a communication interconnect (e.g., a repair module 130A described with reference to FIG. 1) may generate only portions of this table. In some embodiments, the repair module does not generate or store a table similar to the example table 600 to perform communication interconnect repairs as described herein.

The example column 630 includes examples of communication interconnects with varying levels of damage.

The repair category 601 identifies how many of the repair lanes will be used. In some embodiments, a repair module can default to using a certain repair lane each time damage occurs. For example, in the example table 600, the repair lane physically closest to the damaged lane is selected as the repair lane.

The repair code 602 indicates to the repair module sending or receiving communication data which logical lanes have been reassigned to different physical lanes. The repair codes used here are only illustrative. A repair code 602 can be generated for each repair lane in a communication interconnect. As illustrated, there are two repair lanes, so two repair codes are illustrated in the repair code 602 column for each example 630. Other repair codes schemas are possible. The top repair code corresponds to the first repair lane 610 (e.g., RL0), and the bottom repair code in parenthesis corresponds to the second repair lane 611 (e.g., RL1).

In the illustrative example, the repair code is in a reset, or default value if all values are "1." There are four physical data lanes which are each represented in the binary repair code as 00, 01, 10, and 11, respectively. The first bit is added here as in indication that the communication interconnect is damaged. A "0" first digit indicates damage to the communication interconnect, while a "1" first digit indicates no damage to the communication interconnect. In an alternative example and particular embodiment having thirty-six lanes, the repair code can be a 6-digit binary value, where "111111" is the reset value, and any other value identifies a damaged lane. For example, the repair code "100001" would indicate that lane_33 is damaged, and the repair code "000010" would indicate that lane_2 is damaged.

The lane repaired 603 column is included for table readability, and indicates which lane of the communication interconnect has been repaired.

Physical lanes 604 include a first repair lane 610 (also denoted in the table as RL0) and a second repair lane 611 (also denoted in the table as RL1). Physical lanes 604 also include a first data lane 620, second data lane 621, third data lane 622, and fourth data lane 623 (also denoted in the table as DL0, DL1, DL2, and DL3, respectively).

In the first example 631, the communication interconnect is not damaged. Thus, the repair codes are in a default, or reset state (e.g., "111," and "(111)," respectively). The lane repaired 603 column indicates that no lanes have been repaired.

In the second example 632, the communication interconnect is damaged at the first data lane 620. The first repair code indicates this damage with "000." Since there is no other damage to the communication interconnect, the second repair lane 611 is not used and thus the second repair code is "111," illustrated as "(111)." The lane repaired 603 column indicates that the first data lane 620 is repaired. In the first data lane 620 column, an "XX" indicates that the first data lane 620 is damaged. In the first repair lane 610 column, "DL0" indicates that the logical lane previously assigned to the first data lane 620 has been reassigned to the first repair lane 610.

In the third example 633, the communication interconnect is damaged at the fourth data lane 623. The first repair code does not indicate any damage because the fourth data lane 623 is closest to the second repair lane 611. The second repair code indicates the damage to the fourth data lane 623 with the code "011" which indicates that the fourth index or fourth physical lane is damaged. The lane repaired 603 column indicates that the fourth data lane 623 is repaired. In the fourth data lane 623 column, "XX" indicates that the fourth data lane 623 is damaged. In the second repair lane 611 column, "DL3" indicates that the logical lane previously assigned to the fourth data lane 623 has been reassigned to the second repair lane 611.

In the fourth example 634, the communication interconnect is damaged at the first data lane 620 and the second data lane 621. The first repair code indicates the damage to the first data lane 620 with "000." The second repair code indicates the damage to the second data lane 621 with "001." The lane repaired column 603 indicates that the first data lane 620 and the second data lane 621 are repaired. In the first repair lane 610 column, the "DL0" indicates that the logical lane that was previously assigned to the first data lane 620 has been reassigned to the first repair lane 610. In the first data lane 620 column, the "XX" indicates that the first data lane 620 is damaged. In the second data lane 621 column, the "XX" indicates that the second data lane 621 is damaged. In the third data lane column 622, the "DL1" indicates that the logical lane previously assigned to the second data lane 621 has been reassigned to the third data lane 622. In the fourth data lane column 623, the "DL2" indicates that the logical lane previously assigned to the third data lane 622 has been reassigned to the fourth data lane 623. In the second repair lane 611 column, the "DL3" indicates that the logical lane previously assigned to the fourth data lane 623 has been reassigned to the second repair lane 611.

It can be appreciated that the example table 600 is merely illustrative, and that additional data lanes and repair lanes are also considered.

Figure 7:
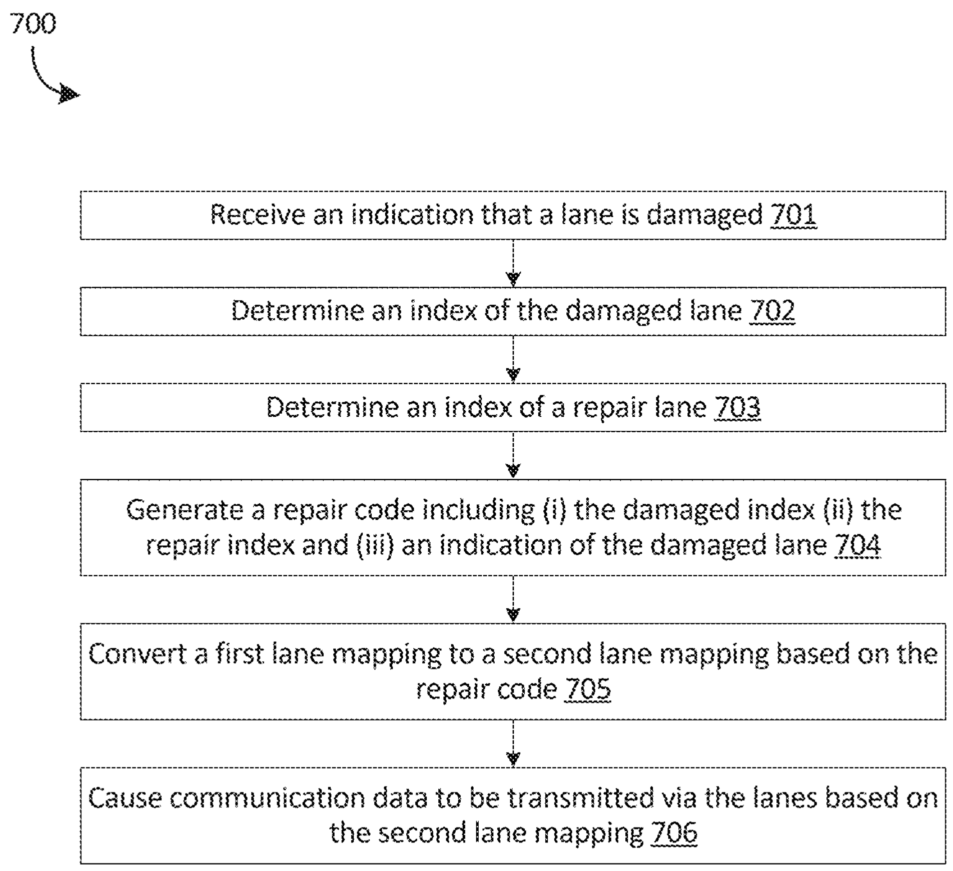
FIG. 7 is a flow diagram of an example method for lane failure repair in a communication interconnect, according to aspects of the disclosure.

FIG. 7 is a flow diagram of an example method 700 for lane failure repair in a communication interconnect, according to aspects of the disclosure. The method 700 can be performed by control logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the datalink layer logic 112A or repair module 130A of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 701, the control logic performing the method 700 receives an indication that a lane is damaged. The lane can be a communication lane of a channel (e.g., a group of communication lanes). The channel can be one of many channels in a communication interconnect that connects one or more devices together via a communication network, as described with reference to FIG. 1.

At operation 702, the control logic determines an index of the damaged lane. The index can represent a physical lane associated with the damaged lane (e.g., a physical conductor, trace, fiber, or the like) that transmits and/or receives a specific subset of communication data transmitted and/or received via the communication channel.

At operation 703, the control logic determines an index of a repair lane. The index of the repair lane can similarly represent a physical lane associated with the repair lane.

At operation 704, the control logic generates a repair code including (i) the damaged index (ii) the repair index and (iii) and indication of the damaged lane. In some embodiments, the control logic receives an indication of the damaged lane from another component of device (e.g., the device 110A of FIG. 1). For example, and in some embodiments, the BIST block 330 can be used to determine whether a lane is damaged, as described above with reference to FIGS. 3A-B.

At operation 705, the control logic converts a first lane mapping (e.g., damaged lane mapping) to a second lane mapping (e.g., repaired lane mapping) based on the repair code. In some embodiments, the first lane mapping is stored at respective registers corresponding to each lane, as described above with reference to FIG. 4. In some embodiments, the second lane mapping is stored at respective registers corresponding to each lane. In some embodiments, the lane mappings can be stored in a data store associated with the repair module. For example, the full repair code representing the lane mappings and lane damage information for all the lanes of the communication channel can be stored in a data store associated with the repair module, in contrast to each lane storing respective lane damage and lane mappings for the particular lane.

In some embodiments, to convert the first lane mapping to the second lane mapping, the control logic can selectively enable or disable data transfer for respective lanes. For example, when a lane is damaged, the control logic can disable data transfer for the damaged lane. When a lane is assigned to a repair index (e.g., a logical data lane is assigned to a physical repair lane) the control logic can enable data transfer for the repair lane.

At operation 706, the control logic causes communication data to be transmitted via the lanes of the communication channel based on the second lane mapping. In some embodiments, the first lane mapping can be used to transmit the data. A repair block can interface with the lanes and convert the transmission of the data to the second lane mapping. That is, the device transmitting the data can transmit the data without knowledge of the remapping to repair lanes of the device.

Figure 8:
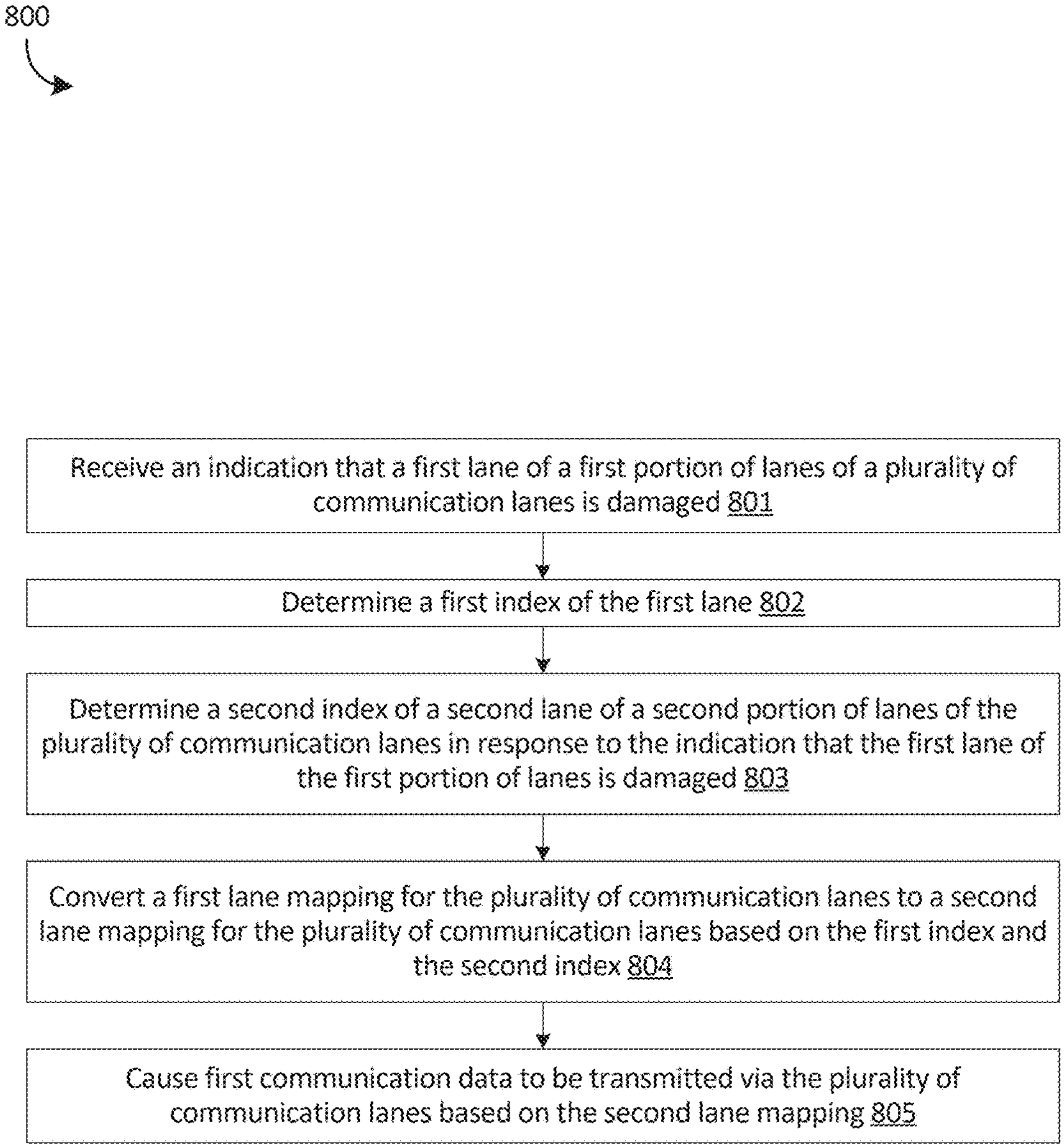
FIG. 8 is an example flow diagram of an example method for lane failure repair in a communication interconnect, according to some aspects of the disclosure.

FIG. 8 is an example flow diagram of an example method 800 for lane failure repair in a communication interconnect, according to some aspects of the disclosure. The method 800 can be performed by control logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 is performed by the datalink layer logic 112A or repair module 130A of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 801, the control logic performing the method 800 receives an indication that a first lane of a first portion of lanes of a plurality of communication lanes is damaged.

At operation 802, the control logic determines a first index of the first lane.

At operation 803, the control logic determines a second index of a second lane of a second portion of lanes of the plurality of communication lanes responsive to the indication that the first lane of the first portion of lanes is damaged.

At operation 804, the control logic converts a first lane mapping for the plurality of communication lanes to a second lane mapping for the plurality of communication lanes based on the first index and the second index. In some embodiments, the control logic can generate the second lane mapping based on a repair code. The control logic can generate the second lane mapping by converting the first lane mapping based on the repair code. The repair code can include the (i) the first index (ii) the second index and (iii) an indication of the damaged lane (e.g., the first lane). In some embodiments, the repair code is generated at a repair block coupled to the control logic. In some embodiments, the repair code is received as input during a step of the manufacturing process. In some embodiments, the repair code is based on one or more burnt fuses as indicated by a fuse controller, where fuses are burnt to represent damaged lanes of the communication channel. In some embodiments, each lane has a respective fuse.

In alternative embodiments, once the damage is determined, fuses can be burned representative of the damaged and non-damaged lanes. For example, given sixteen lanes, fuses may be burned to represent the binary values of the lanes which are damaged, thus requiring only three sets of fuses for each repair lane included in the communication interconnect.

In some embodiments, the second lane mapping shifts two or more lanes from the first lane mapping. For example, the control logic may only reassign logical lanes to adjacent physical lanes. Thus, for a failed physical lane at the index_3, where the repair lane is below the index_0, multiple logical lanes (e.g., the logical lane_0, logical lane_1, logical lane_2, and logical lane_3) can be reassigned to new physical lanes in the second lane mapping. For example, the logical lane_3 would be assigned to the index_2, the logical lane_2 assigned to the index_1, the logical lane_1 assigned to the index_0, and the logical lane_0 assigned to the index of the repair lane.

In an alternative embodiment, the control logic may assign logical lanes to non-adjacent physical lanes. For example, for the failed physical lane at the index_3, where the repair lane is below the index_0, the control logic may reassign the logical lane_3 (previously associated with the index_3) to the repair lane, forgoing reassignment of the logical lanes 0-2, as described in the previous example.

In some embodiments, the first lane (e.g., the first damaged lane) can be reassigned to the index of the second lane (e.g., the first repair lane), while a third lane (e.g., a second damaged lane) can be reassigned to the index of a fourth lane (e.g., a second repair lane). It can be appreciated that the number of repair lanes is limited only by practical physical implementations, and that any number of repair lanes may be manufactured and implemented, as necessary.

In some embodiments, a first damaged lane is part of a first set of lanes and a second damaged lane is part of a second set of lanes. The first set of lanes is associated with a first repair lane and the second set of lanes is associated with a second repair lane. The first repair lane can be used to repair the first damaged lane, and the second repair lane can be used to repair the second damaged lane. In such embodiments, additional repair lanes may be associated respectively with each of the first set of lanes, the second set of lanes (or additional sets of lanes). In such embodiments, a particular damaged lane can only be repaired by repair lanes associated with the set of lanes that includes the particular damaged lane. For example, if a first set of lanes includes damaged lane_1, damaged lane_1 could not be repaired by a repair lane two associated with a second set of lanes.

At operation 805, the control logic causes first communication data to be transmitted via the plurality of communication lanes based on the second lane mapping.

COMPUTER SYSTEMS

Figure 9:
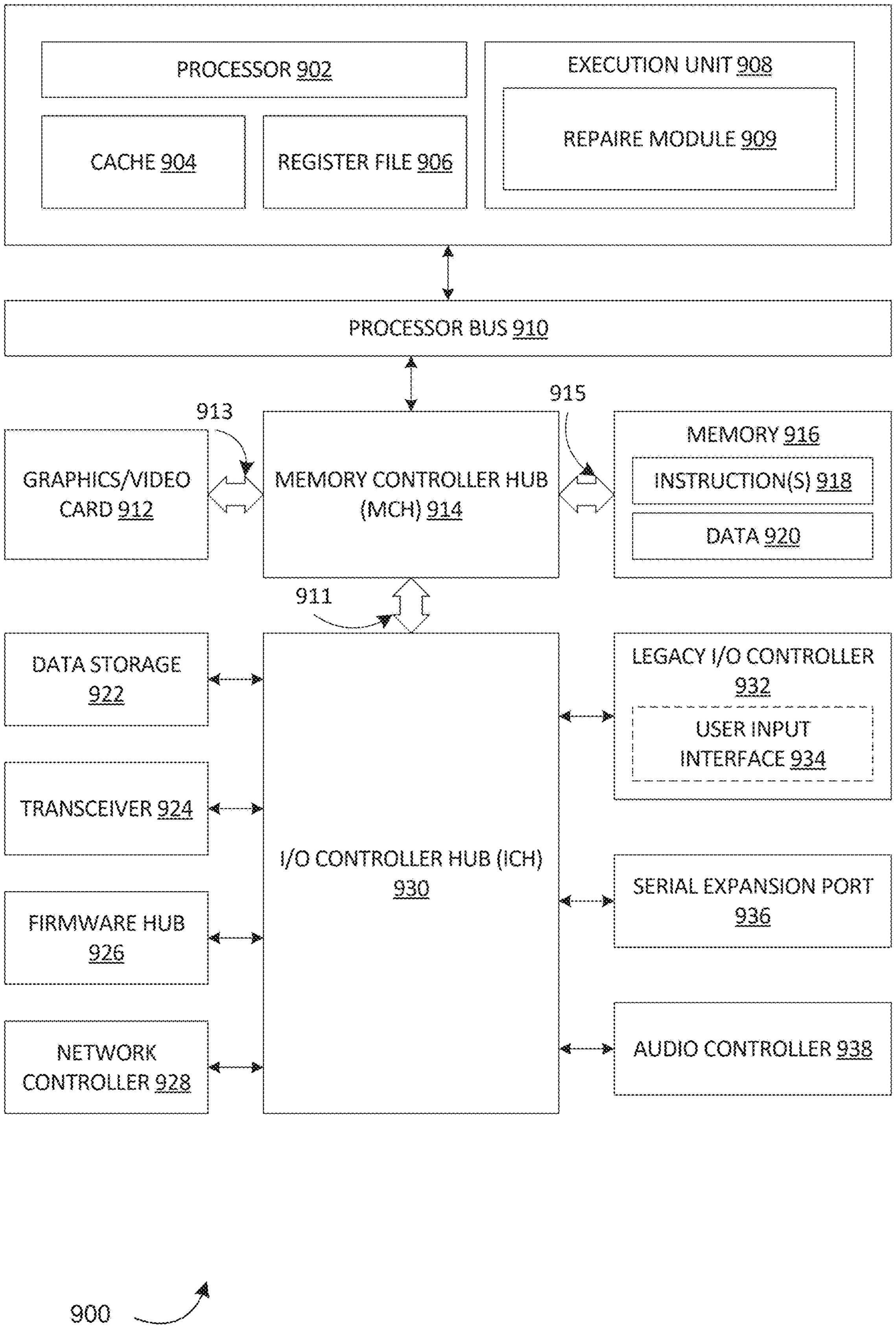
FIG. 9 is a block diagram illustrating an exemplary computer system which can be a system with interconnected devices and components, a system-on-a-chip (SOC), or some combination thereof, according to aspects of the disclosure.

FIG. 9 is a block diagram illustrating an exemplary computer system, such as computer system 900, which can be a system with interconnected devices and components, a system-on-a-chip (SOC), or some combination thereof, according to aspects of the disclosure. In some embodiments, computer system 900 can include, without limitation, a component, such as a processor 902, to employ execution units including logic to perform algorithms for process data, in accordance with the present disclosure, such as in the embodiments described herein. In some embodiments, computer system 900 can include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) can also be used. In some embodiments, computer system 900 can execute a version of WINDOWS' operating system available from Microsoft Corporation of Redmond, Wash., although other operating systems (UNIX and Linux, for example), embedded software, and/or graphical user interfaces, can also be used.

Embodiments can be used in other devices such as handheld devices and embedded applications. Some examples of handheld devices include cellular phones, Internet Protocol devices, digital cameras, personal digital assistants (PDAs), and handheld PCs. In some embodiments, embedded applications can include a microcontroller, a digital signal processor (DSP), a system on a chip, network computers (NetPCs), set-top boxes, network hubs, wide area network (WAN) switches, or any other system that can perform one or more instructions in accordance with at least one embodiment.

In some embodiments, computer system 900 can include, without limitation, processor 902 that can include, without limitation, one or more execution units 908 to perform operations according to techniques described herein. In some embodiments, computer system 900 is a single-processor desktop or server system, but in another embodiment, the computer system 900 can be a multiprocessor system. In some embodiments, processor 902 can include, without limitation, a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In some embodiments, processor 902 can be coupled to a processor bus 910 that can transmit data signals between processor 902 and other components in computer system 900.

In some embodiments, processor 902 can include, without limitation, a Level 1 (L1) internal cache memory 904. In some embodiments, processor 902 can have a single internal cache or multiple levels of internal cache. In some embodiments, the cache memory can reside external to processor 902. Other embodiments can also include a combination of both internal and external caches depending on particular implementation and needs. In some embodiments, register file 906 can store different types of data in various registers, including and without limitation, integer registers, floating-point registers, status registers, and instruction pointer registers.

In some embodiments, an execution unit 908, including and without limitation, logic to perform integer and floating-point operations, also resides in processor 902. In some embodiments, processor 902 can also include a microcode (μcode) read-only memory (ROM) that stores microcode for certain macro instructions. In some embodiments, execution unit 908 can include logic to handle a repair module 909. In some embodiments, by including repair module 909 in an instruction set of a general-purpose processor, such as processor 902, along with associated circuitry to execute instructions, operations used by many multimedia applications can be performed using packed data in a general-purpose processor, such as processor 902. In one or more embodiments, many multimedia applications can be accelerated and executed more efficiently by using the full width of a processor's data bus for performing operations on packed data, which can eliminate the need to transfer smaller units of data across the processor's data bus to perform one or more operations one data element at a time.

In some embodiments, execution unit 908 can also be used in microcontrollers, embedded processors, graphics devices, DSPs, and other types of logic circuits. In some embodiments, computer system 900 can include, without limitation, a memory 916. In some embodiments, memory 916 can be implemented as a Dynamic Random Access Memory (DRAM) device, a Static Random Access Memory (SRAM) device, a flash memory device, or other memory devices. In some embodiments, memory 916 can store instruction(s) 918 and/or data 920 represented by data signals that can be executed by processor 902.

In some embodiments, the system logic chip can be coupled to processor bus 910 and memory 916. In some embodiments, the system logic chip can include, without limitation, a memory controller hub (MCH), such as MCH 914, and processor 902 can communicate with MCH 914 via processor bus 910. In some embodiments, MCH 914 can provide a high bandwidth memory path 915 to memory 916 for instruction and data storage and for storage of graphics commands, data, and textures. In some embodiments, MCH 914 can direct data signals between processor 902, memory 916, and other components in computer system 900 and bridge data signals between processor bus 910, memory 916, and a system input/output (I/O) 911. In some embodiments, a system logic chip can provide a graphics port for coupling to a graphics controller. In some embodiments, MCH 914 can be coupled to memory 916 through a high bandwidth memory path 915, and graphics/video card 912 can be coupled to MCH 914 through an Accelerated Graphics Port (AGP) interconnect 913.

In some embodiments, computer system 900 can use the system I/O 911 that is a proprietary hub interface bus to couple the MCH 914 to I/O controller hub (ICH), such as ICH 930. In some embodiments, ICH 930 can provide direct connections to some I/O devices via a local I/O bus. In some embodiments, a local I/O bus can include, without limitation, a high-speed I/O bus for connecting peripherals to memory 916, chipset, and processor 902. Examples can include, without limitation, data storage 922, a transceiver 924, a firmware hub (flash Basic Input/Output System (BIOS)) 926, a network controller 928, a legacy I/O controller 932 containing a user input interface 934, a serial expansion port 936, such as Universal Serial Bus (USB), and an audio controller 938. In some embodiments, data storage 922 can include a hard disk drive, a floppy disk drive, a compact disc read-only memory (CD-ROM) device, a flash memory device, or other mass storage devices.

In some embodiments, FIG. 9 illustrates a computer system 900, which includes interconnected hardware devices or "chips," whereas, in other embodiments, FIG. 9 can illustrate an exemplary System on a Chip (SoC). In some embodiments, devices can be interconnected with proprietary interconnects, standardized interconnects (e.g., Peripheral Component Interconnect buses (e.g., PCI, PCI Express)), or some combination thereof. In some embodiments, one or more components of computer system 900 are interconnected using compute express link (CXL) interconnects.

Figure 10:
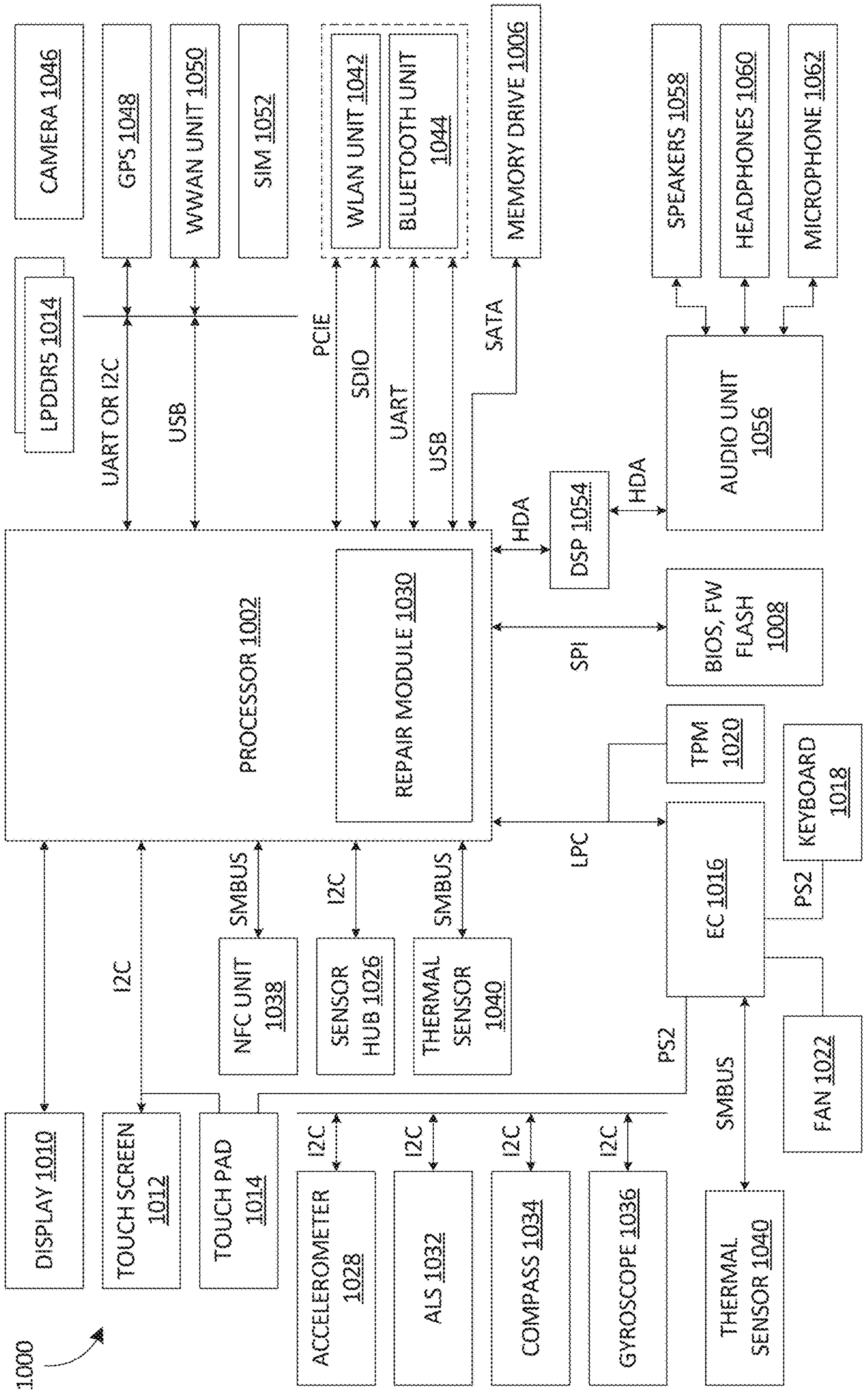
FIG. 10 is a block diagram illustrating an electronic device for utilizing a processor, according to aspects of the disclosure.

FIG. 10 is a block diagram illustrating an electronic device 1000 for utilizing a processor 1002, according to aspects of the disclosure. In some embodiments, electronic device 1000 can be, for example, and without limitation, a notebook, a tower server, a rack server, a blade server, a laptop, a desktop, a tablet, a mobile device, a phone, an embedded computer, or any other suitable electronic device.

In some embodiments, electronic device 1000 can include, without limitation, processor 1002 communicatively coupled to any suitable number or kind of components, peripherals, modules, or devices. In some embodiments, processor 1002 coupled using a bus or interface, such as an Inter-Integrated Circuit (I2C) bus, a System Management Bus (SMBus), a Low Pin Count (LPC) bus, a Serial Peripheral Interface (SPI), a High Definition Audio (HDA) bus, a Serial Advance Technology Attachment (SATA) bus, a Universal Serial Bus (USB) (including USB 1.0/1/1, USB 2.0, USB 3.0/3.1 Gen1/3.1 Gen2, and USB 4), or a Universal Asynchronous Receiver/Transmitter (UART) bus. In some embodiments, FIG. 10 illustrates a system, which includes interconnected hardware devices or "chips," whereas in other embodiments, FIG. 10 can illustrate an exemplary System on a Chip (SoC). In some embodiments, devices illustrated in FIG. 10 can be interconnected with proprietary interconnects, standardized interconnects (e.g., PCIe), or some combination thereof. In some embodiments, one or more components of FIG. 10 are interconnected using compute express link (CXL) interconnects.

In some embodiments, FIG. 10 can include a display 1010, a touch screen 1012, a touch pad 1014, a Near Field Communications unit (NFC) 1038, a sensor hub 1026, a thermal sensor 1040, an Express Chipset (EC), such as EC 1016, a Trusted Platform Module (TPM), such as TPM 1020, BIOS/firmware(FW)/flash memory, such as BIOS, FW Flash 1008, a DSP 1054, a memory drive 1006 such as a Solid State Disk (SSD) or a Hard Disk Drive (HDD), a wireless local area network unit (WLAN), such as WLAN unit 1042, a Bluetooth unit 1044, a Wireless Wide Area Network unit (WWAN), such as WWAN unit 1050, a Global Positioning System (GPS) 1048, a camera (USB 3.0 camera) 1046, such as a USB 3.0 camera, and/or a Low Network bandwidth Double Data Rate (LPDDR) memory unit, such as LPDDR5 1004 implemented in, for example, LPDDR5 standard. These components can each be implemented in any suitable manner.

In some embodiments, other components can be communicatively coupled to processor 1002 through the components discussed above. In some embodiments, processor 1002 can include an repair module 1030. In some embodiments, an accelerometer 1028, Ambient Light Sensor (ALS), such as ALS 1032, compass 1034, and a gyroscope 1036 can be communicatively coupled to sensor hub 1026. In some embodiments, thermal sensor 1040, a fan 1022, a keyboard 1018, and a touch pad 1014 can be communicatively coupled to EC 1016. In some embodiments, speakers 1058, headphones 1060, and microphone 1062 can be communicatively coupled to an audio unit 1056 which can, in turn, be communicatively coupled to DSP 1054. In some embodiments, audio unit 1056 can include, for example, and without limitation, an audio coder/decoder (codec) and a class-D amplifier. In some embodiments, a subscriber identification module (SIM) card, such as SIM 1052 can be communicatively coupled to WWAN unit 1050. In some embodiments, components such as WLAN unit 1042 and Bluetooth unit 1044, as well as WWAN unit 1050 can be implemented in a Next Generation Form Factor (NGFF).

Figure 11:
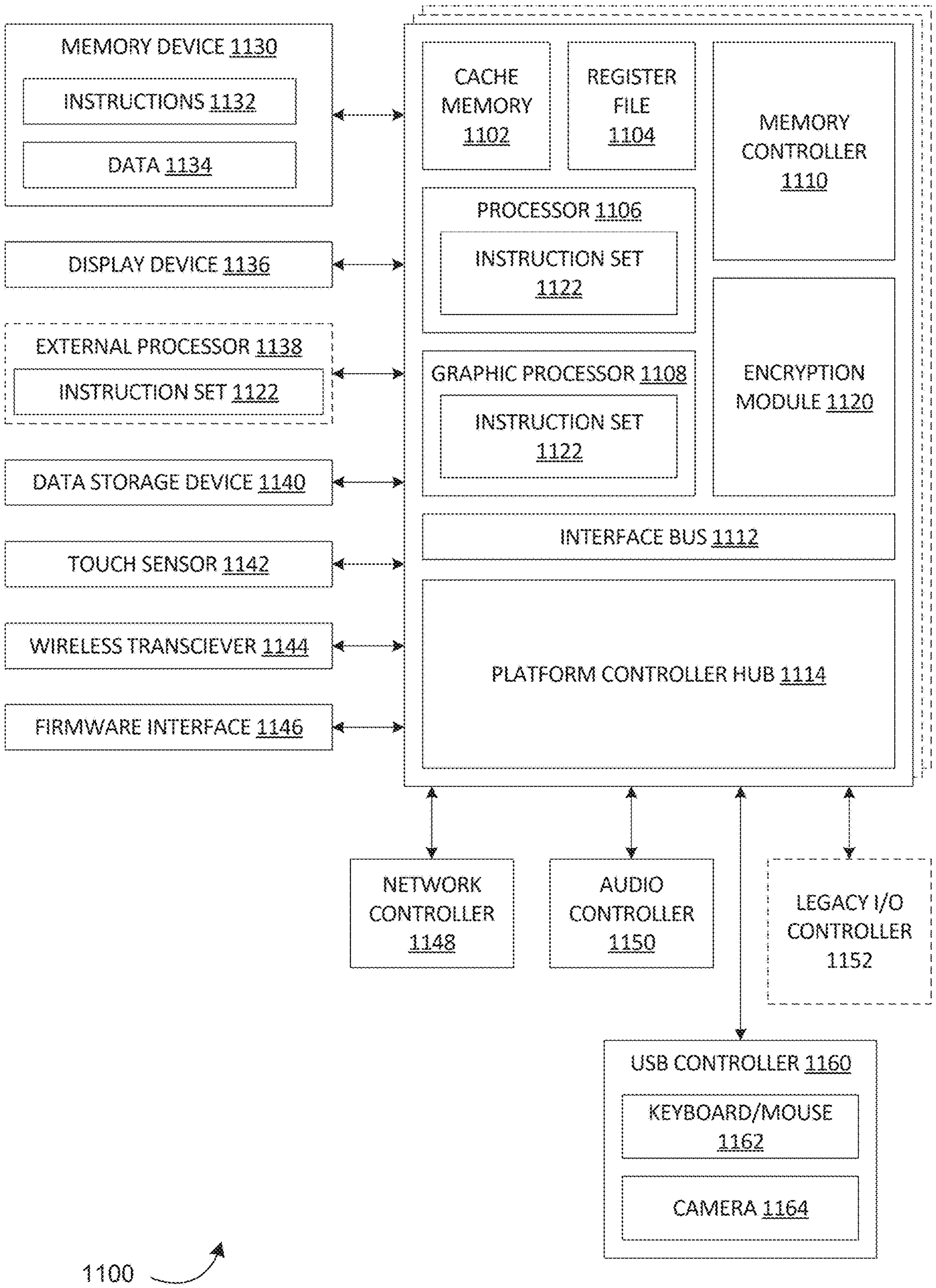
FIG. 11 is a block diagram of a processing system, according to aspects of the disclosure.

FIG. 11 is a block diagram of a processing system 1100, according to aspects of the disclosure. In some embodiments, the processing system 1100 includes cache memory 1102, register file 1104, processors 1106, graphics processors 1108, memory controller 1110, interface bus 1112, platform controller hub 1114, and an repair module 1120. Processing system 1100 can be a single processor desktop system, a multiprocessor workstation system, or a server system having a large number of processors 1106 or graphics processors 1108. In some embodiments, the processing system 1100 is a processing platform incorporated within a system-on-a-chip (SoC) integrated circuit for use in mobile, handheld, or embedded devices.

In some embodiments, the processing system 1100 can include, or be incorporated within a server-based gaming platform, a game console, including a game and media console, a mobile gaming console, a handheld game console, or an online game console. In some embodiments, the processing system 1100 is a mobile phone, smart phone, tablet computing device, or mobile Internet device. In some embodiments, the processing system 1100 can also include, couple with, or be integrated within, a wearable device, such as a smart watch wearable device, smart eyewear device, augmented reality device, or virtual reality device. In some embodiments, the processing system 1100 is a television or set-top box device having one or more processors 1106 and a graphical interface generated by one or more graphics processors 1108.

In some embodiments, one or more processors 1106 each include one or more of the processor cores to process instructions which, when executed, perform operations for system and user software. In some embodiments, one or more processors 1106 and/or one or more graphics processors can be configured to process a portion of the instruction set 1122. In some embodiments, instruction set 1122 can facilitate Complex Instruction Set Computing (CISC), Reduced Instruction Set Computing (RISC), or computing via a Very Long Instruction Word (VLIW). In some embodiments, processor cores can each process a different instruction set from Instruction set 1122, which can include instructions to facilitate emulation of other instruction sets (not illustrated). In some embodiments, processor cores can also include other processing devices, such as a Digital Signal Processor (DSP).

In some embodiments, processors 1106 includes cache memory 1102. In some embodiments, processors 1106 can have a single internal cache or multiple levels of internal cache. In some embodiments, cache memory 1102 is shared among various components of processors 1106. In some embodiments, processors 1106 also uses an external cache (e.g., a Level-3 (L3) cache or Last Level Cache (LLC)) (not illustrated), which can be shared among processor cores using known cache coherency techniques. In some embodiments, register file 1104 is additionally included in processors 1106, which can include different types of registers for storing different types of data (e.g., integer registers, floating-point registers, status registers, and an instruction pointer register). In some embodiments, register file 1104 can include general-purpose registers or other registers.

In some embodiments, one or more processors 1106 are coupled with one or more interface bus 1112 to transmit communication signals such as address, data, or control signals between processor cores and other components in processing system 1100. In some embodiments, interface bus 1112, in one embodiment, can be a processor bus, such as a version of a Direct Media Interface (DMI) bus. In some embodiments, interface bus 1112 is not limited to a DMI bus, and can include one or more peripheral component interconnect (PCI) buses (e.g., PCI, PCI Express), memory busses, or other types of interface busses. In some embodiments, processors 1106 include an integrated memory controller (e.g., memory controller 1110) and a platform controller hub 1114 (PCH). In some embodiments, memory controller 1110 facilitates communication between a memory device and other components of the processing system 1100, while platform controller hub 1114 provides connections to I/O devices via a local I/O bus.

In some embodiments, the memory device 1130 can be a dynamic random-access memory (DRAM) device, a static random-access memory (SRAM) device, a flash memory device, a phase-change memory device, or some other memory device having suitable performance to serve as process memory. In some embodiments, the memory device 1130 can operate as system memory for processing system 1100 to store instructions 1132 and data 1134 for use when one or more processors 1106 executes an application or process. In some embodiments, memory controller 1110 also optionally couples with an external processor 1138, which can communicate with one or more graphics processors 1108 in processors 1106 to perform graphics and media operations. In some embodiments, a display device 1136 can connect to processors 1106. In some embodiments, the display device 1136 can include one or more of an internal display device, as in a mobile electronic device or a laptop device, or an external display device attached via a display interface (e.g., DisplayPort, etc.). In some embodiments, display device 1136 can include a head-mounted display (HMD) such as a stereoscopic display device for use in virtual reality (VR) applications or augmented reality (AR) applications.

In some embodiments, the platform controller hub 1114 enables peripherals to connect to memory device 1130 and processors 1106 via a high-speed I/O bus. In some embodiments, I/O peripherals include, but are not limited to, a data storage device 1140 (e.g., hard disk drive, flash memory, etc.), a touch sensor 1142, a wireless transceiver 1144, firmware interface 1146, a network controller 1148, or an audio controller 1150.

In some embodiments, the data storage device 1140 can connect via a storage interface (e.g., SATA) or via a peripheral bus, such as a PCI bus (e.g., PCI, PCI Express). In some embodiments, touch sensor 1142 can include touch screen sensors, pressure sensors, or fingerprint sensors. In some embodiments, wireless transceiver 1144 can be a Wi-Fi transceiver, a Bluetooth transceiver, or a mobile network transceiver such as a 3G, 4G, Long Term Evolution (LTE), 5G, or 6G transceiver. In some embodiments, firmware interface 1146 enables communication with system firmware and can be, for example, a unified extensible firmware interface (UEFI). In some embodiments, the network controller 1148 can enable a network connection to a wired network. In some embodiments, a high-performance network controller (not illustrated) couples with interface bus 1112. In some embodiments, audio controller 1150 can be a multi-channel high-definition audio controller. In some embodiments, the processing system 1100 includes an optional legacy I/O controller 1152 for coupling legacy (e.g., Personal System-2 (PS/2)) devices to the processing system 1100. In some embodiments, the platform controller hub 1114 can also connect to one or more Universal Serial Bus (USB) controllers, such as USB controller 1160 to connect input devices, such as a keyboard and mouse combination (keyboard/mouse 1162), a camera 1164, or other USB input devices.

In some embodiments, an instance of memory controller 1110 and platform controller hub 1114 can be integrated into a discreet external graphics processor, such as external processor 1138. In some embodiments, the platform controller hub 1114 and/or memory controller 1110 can be external to one or more processors 1106. For example, in some embodiments, the processing system 1100 can include an external memory controller (e.g., memory controller 1110) and the platform controller hub 1114, which can be configured as a memory controller hub and peripheral controller hub within a system chipset that is in communication with the processors 1106.

Figure 12:
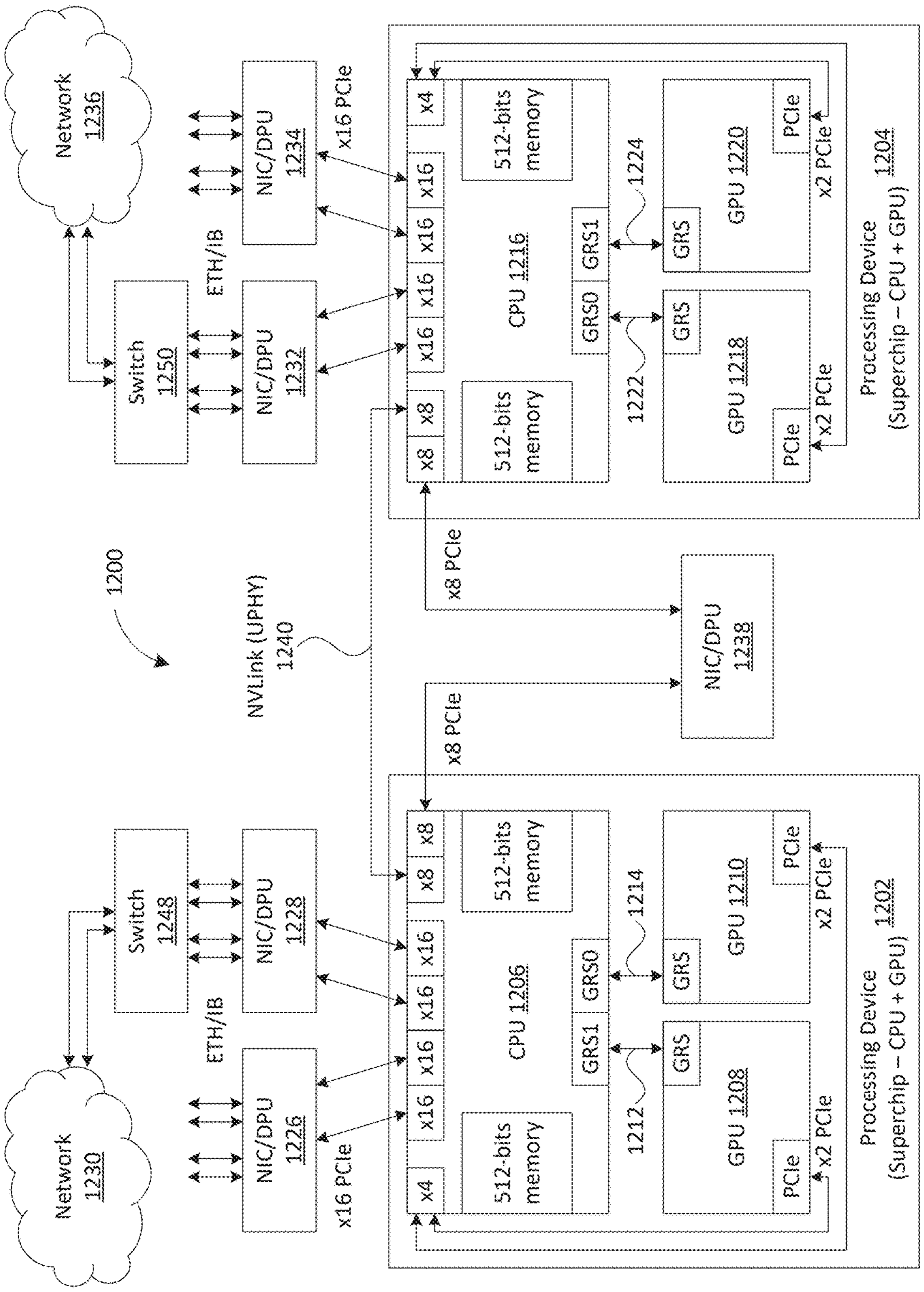
FIG. 12 is a block diagram of a computing system having two processing devices coupled to each other and multiple networks according to some aspects of the disclosure.

FIG. 12 is a block diagram of a computing system 1200 having two processing devices coupled to each other and multiple networks according to some aspects of the disclosure. The computing system 1200 is designed with multiple integrated circuits (referred to as processing devices), where each integrated circuit includes a CPU and two GPUs, forming a powerful and flexible architecture. These processing devices are interconnected via an NVLink (or other high-speed interconnect), enabling high-speed communication between the processing devices, and are also connected through a Network Interface Card (NIC) or Data Processing Unit (DPU) to ensure efficient data transfer across the computing system 1200.

The coupling of processing devices through NVLink allows for seamless data exchange and parallel processing, enhancing overall computational performance. Additionally, these processing devices are connected to multiple networks through one or more network interface cards (NICs) or DPUs, enabling the system to handle complex, multi-network tasks with high bandwidth and low latency. This configuration makes the computing system 1200 highly suitable for demanding applications that require significant processing power, such as artificial intelligence (AI), machine learning (ML), and data-intensive computing, while ensuring robust connectivity and scalability across various networked environments. The integrated circuits of the computing system 1200 can include one or more CPUs and one or more GPUs. An example architecture of a multi-GPU architecture is illustrated in FIG. 12.

As illustrated in FIG. 12, the computing system 1200 includes a processing device 1202 with a multi-GPU architecture. In particular, the processing device 1202 includes a CPU 1206, a GPU 1208, and a GPU 1210. The CPU 1206 can be coupled to the GPU 1208 via an die-to-die (D2D) or chip-to-chip (C2C) interconnect 1212, such as a Ground-Referenced Signaling interconnect (GRS interconnect). The CPU 1206 can be coupled to the GPU 1210 via a D2D or C2C interconnect 1214. The CPU 1206 can also couple to the GPU 1208 and GPU 1210 via PCIe interconnects. The CPU 1206 can be coupled to one or more network interface cards (NICs) or data processing units (DPUs), which are coupled to one or more networks. For example, as illustrated in FIG. 12, the CPU 1206 is coupled to a first NIC/DPU 1226, which is coupled to a network 1230. The CPU 1206 is also coupled to a second NIC/DPU 1228, which is coupled to the network 1230. The NIC/DPU 1226 and NIC/DPU 1228 can be coupled to the network 1230 over Ethernet (ETH) or InfiniBand (IB) connections.

The computing system 1200 also includes a processing device 1204 with a multi-GPU architecture. In particular, the processing device 1204 includes a CPU 1216, a GPU 1218, and a GPU 1220. The CPU 1216 can be coupled to the GPU 1218 via an D2D or C2C interconnect 1222. The CPU 1216 can be coupled to the GPU 1220 via a D2D or C2C interconnect 1224. The CPU 1216 can also couple to the GPU 1218 and GPU 1220 via PCIe interconnects. The CPU 1216 can be coupled to one or more NICs or DPUs, which are coupled to one or more networks. For example, as illustrated in FIG. 12, the CPU 1216 is coupled to a first NIC/DPU 1232, which is coupled to a network 1236. The CPU 1216 is also coupled to a second NIC/DPU 1234, which is coupled to the network 1236. The NIC/DPU 1232 and NIC/DPU 1234 can be coupled to the network 1236 over Ethernet (ETH) or InfiniBand (IB) connections.

In at least one embodiment, the processing device 1202 and the processing device 1204 can communicate with each other via a NIC/DPU 1238, such as over PCIe interconnects. The processing device 1202 and processing device 1204 can also communicate with each other over high-bandwidth communication interconnects 1240, such as an NVLink interconnect or other high-speed interconnects.

The computing system 1200 includes various types of interconnects. Each of the interconnects includes the transceivers or receivers that include a controller and repair module 130A of FIG. 1, as described herein.

In at least one embodiment, the computing system 1200 is used for high-speed network communication and includes a processing unit (e.g., CPU 1206, GPU 1208, GPU 1208, CPU 1216, GPU 1218, GPU 1220, NIC/DPU 1226, NIC/DPU 1228, NIC/DPU 1232, NIC/DPU 1234, or NIC/DPU 1238), and a network interface coupled to the processing unit. The network interface includes a transceiver circuit operatively coupled to a controller. The transceiver circuit includes an repair module which is controlled by the controller, as described above. The encryption keys are rotated based on commands received at the repair module from the controller. The connection between the controller and the repair module is a local, trusted connection. The communication network that connects the processing device 1202 to the processing device 1204 does not include a connection to the controller, or otherwise process or send encryption keys.

Figure 13:
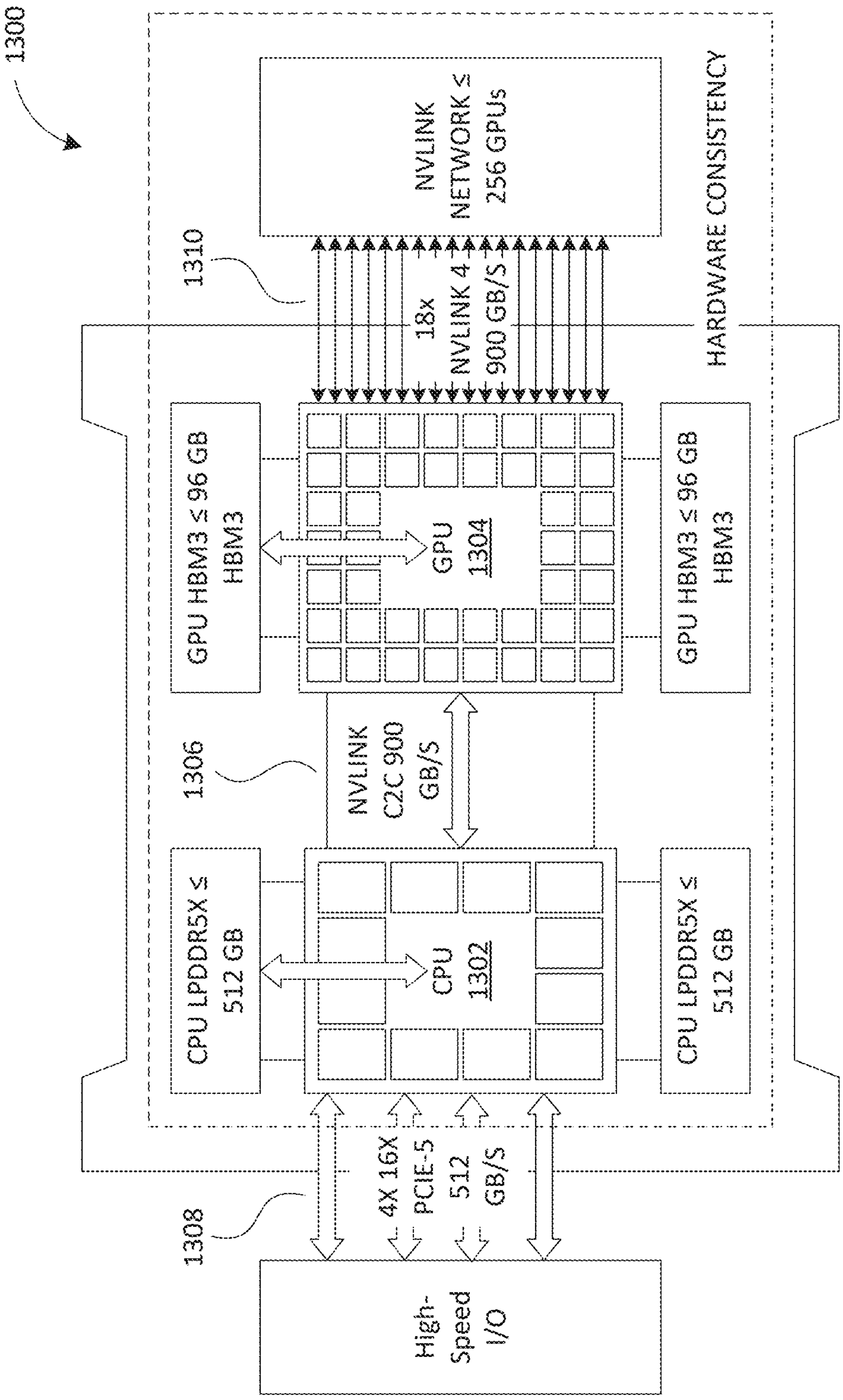
FIG. 13 is a block diagram of a computing system having a CPU and a GPU in a single integrated circuit according to at least one embodiment.

FIG. 13 is a block diagram of a computing system 1300 having a CPU 1302 and a GPU 1304 in a single integrated circuit according to at least one embodiment. The computing system 1300 can be a highly integrated design where a CPU 1302 and GPU 1304 are connected on a single integrated circuit, utilizing an NVLink C2C (Chip-to-Chip) interconnect 1306 to enable fast, low-latency communication between the two processing units. This close integration allows for efficient data transfer and parallel processing between the CPU 1302 and GPU 1304, optimizing performance for complex computational tasks. The GPU elements within the computing system 1300 can be interconnected using an NVLink network, allowing for scalability to include multiple GPU elements (e.g., up to 256 as illustrated), creating a powerful, unified processing environment ideal for large-scale AI, ML, and high-performance computing applications. The NVLink network can be a GPU fabric of high-bandwidth communication interconnects 1310. Additionally, the computing system 1300 can be designed to interface with a high-speed I/O through PCIe interconnects 1308, ensuring rapid data transfer to and from external devices, further enhancing the system's capabilities in handling data-intensive tasks and providing robust connectivity to peripheral components. It should be noted that the C2C interconnects 1306 can be considered D2D interconnects since the CPU 1302 and the GPU 1304 are located on the same integrated circuit. The integrated circuit can include CPU memory (also referred to as main memory) and GPU memory, which are accessible by the CPU 1302 and the GPU 1304, respectively, over high-speed interconnects. The computing system 1300 can bring together performance of the GPU 1304 with the versatility of the CPU 1302. The CPU 1302 can be connected with a high-bandwidth and memory coherent C2C interconnects 1306 in a single integrated circuit. The computing system 1300 can support a link switch system.

The computing system 1300 includes various types of interconnects. Each of the interconnects includes the transceivers or receivers that include the repair module 130A of FIG. 1, as described herein.

In at least one embodiment, the computing system 1300 is used for high-speed network communication and includes a processing unit (e.g., CPU 1302, GPU 1304, NVLink network), and a network interface coupled to the processing unit. The network interface can include the controller as described above with respect to FIG. 11.

Figure 14:
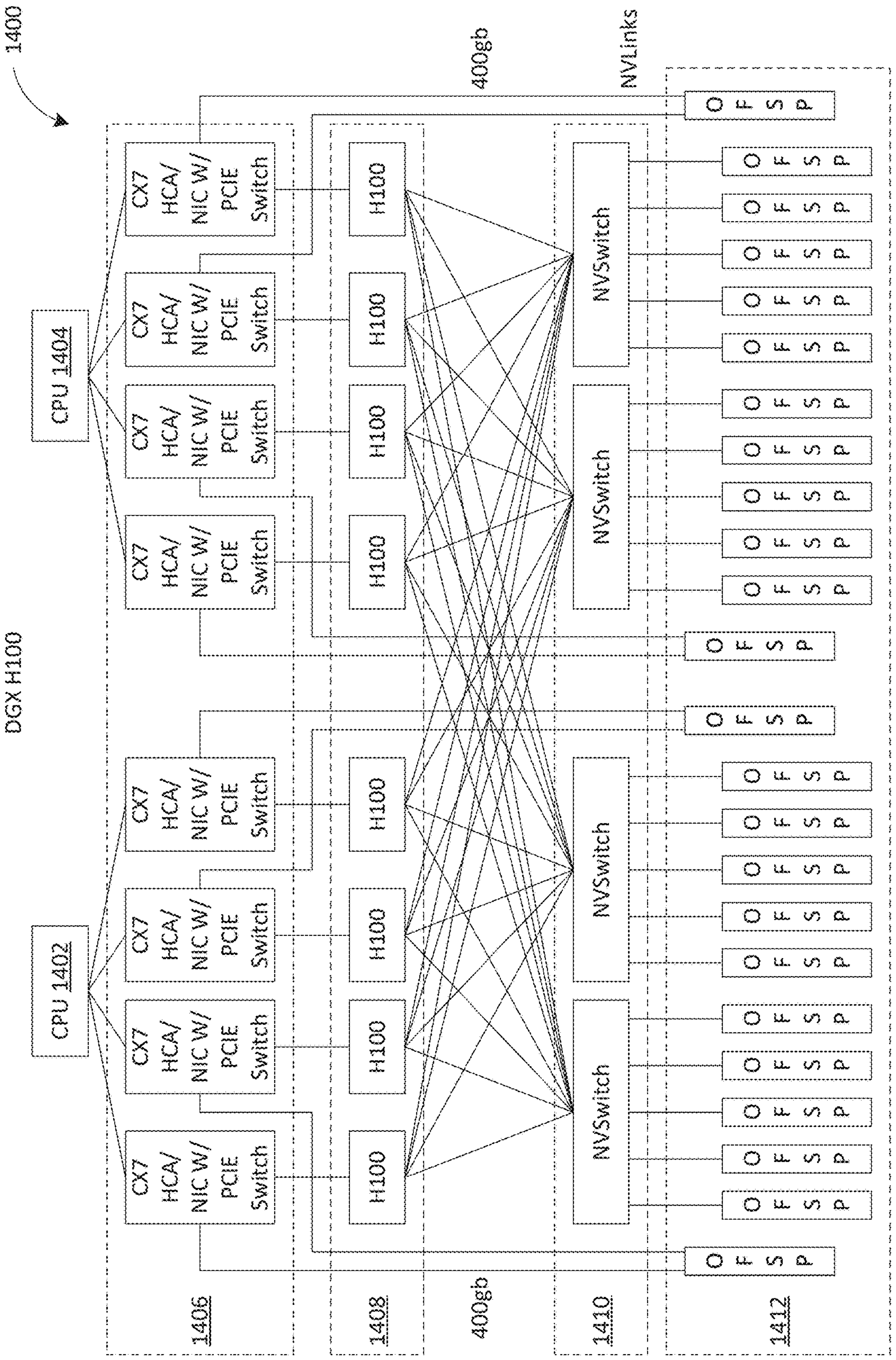
FIG. 14 is a block diagram of a computing system having tensor core GPUs according to at least one embodiment.

FIG. 14 is a block diagram of a computing system 1400 having tensor core GPUs 1408 according to at least one embodiment. The computing system 1400 can be an NVIDIA© DGX H100 system which is a high-performance computing platform designed to meet the demands of AI, ML, and deep learning (DL) workloads. The computing system 1400 can include multiple tensor core GPUs 1408 (e.g., NVIDIA H100 Tensor Core GPUs). The tensor core GPUs 1408 can each be one of the integrated circuits described above with respect to FIG. 11. The tensor core GPUs 1408 can be optimized for AI/ML/DL applications, offering exceptional performance for deep learning training, inference, and high-performance computing tasks. The tensor core GPUs 1408 within the computing system 1400 are interconnected using high-speed communication interfaces like NVLinks, enabling rapid data transfer between them, which is crucial for handling large-scale AI models and datasets with low latency. This computing system 1400 is designed for scalability, allowing for the integration of additional GPUs as required, making it versatile enough for research, development, and deployment in data centers for production AI workloads. Each GPU is equipped with Tensor Cores, specialized processing units that accelerate matrix operations, a fundamental component of AI and deep learning algorithms. These Tensor Cores enable the system to perform mixed-precision calculations efficiently, balancing speed and accuracy. Given the power consumption and heat generation of multiple tensor core GPUs 1408, the computing system 1400 can include advanced cooling solutions and power management features to ensure safe operation while maintaining peak performance. It is supported by a comprehensive software ecosystem, including NVIDIA's CUDA programming model, AI frameworks like TensorFlow and PyTorch, and other HPC and AI software tools, which enable developers and researchers to harness the full power of the tensor core GPUs 1408 for their specific applications. The computing system 1400 is ideally suited for large-scale AI model training, real-time inference, scientific simulations, data analytics, and other compute-intensive tasks that require massive parallel processing power.

The tensor core GPUs 1408 can be coupled to multiple CPUs, such as CPU 1402 and CPU 1404, using switches 1406 (e.g., CX7 HCA/NIC with PCIe switch). The tensor core GPUs 1408 can be coupled to each other via switches 1410 (e.g., NV-Switches). The switches 1406 and switches 1410 can be coupled to high-speed transceiver modules 1412. The high-speed transceiver modules 1412 can be Octal Small Form-factor Pluggable (OSFP) modules. OSFP modules refer to high-speed transceiver modules designed for rapid data communication, particularly in environments requiring significant bandwidth, such as data centers and high-performance computing systems. These modules support extremely high data rates, typically up to 400 Gbps per module, with future capabilities extending to 900 Gbps or more. OSFP modules interface with the system via the PCIe interface, enabling fast and efficient data transfer between the integrated CPU-GPU components and external networks or other connected systems. Their hot-pluggable nature allows for easy insertion or removal without the need to power down the system, offering flexibility and ease of maintenance, which is crucial in critical-uptime environments. Additionally, OSFP modules are designed for high density, maximizing the number of high-speed connections within limited space, such as in densely packed server racks. By adhering to the latest networking standards, OSFP modules ensure the computing system 1400 remains capable of meeting increasing data demands and can be upgraded to support future advancements in network speeds, thus contributing to the system's overall performance and scalability.

In at least one embodiment, the computing system 1400 can be considered a data-network configuration with full-bandwidth intra-server NVLinks. In this example, all eight tensor core GPUs 1408 can simultaneously saturate eighteen NVLinks to other GPUs within the server. The bandwidth is limited by over-subscription from multiple other GPUs. In another embodiments, data-network configuration can be a half-bandwidth intra-server NVLinks. In this example, all eight tensor core GPUs 1408 can half-subscribe eighteen NVLinks to GPUs in other servers. Four tensor core GPUs 1408 can saturate eighteen NVLinks to GPUs in other servers. This is equivalent of full-bandwidth on AllReduce with Scalable Hierarchical Aggregation and Reduction Protocol (SHARP). The reduction in all-2-all (All2All) bandwidth is a balance with server complexity and costs. In at least one embodiment, all eight tensor core GPUs 1408 can independently transfer data, using Remote Direct Memory Access (RDMA) protocol, over its own dedicated switch (e.g., 400 Gb/s HCA/NIC) in an multi-rail InfiniBand/Ethernet configuration. In this example, 900 GBps of aggregate full-duplex to non-NVLink network devices.

The computing system 1400 includes various types of interconnects. Each of the interconnects includes the transceivers or receivers that include a controller and repair module 130A of FIG. 1, as described herein.

In at least one embodiment, the computing system 1400 is used for high-speed network communication and includes a processing unit (e.g., CPU 1402, CPU 1404, switches 1406, tensor core GPUs 1408, switches 1410, high-speed transceiver modules 1412), and a network interface coupled to the processing unit. The network interface can include the controller as described above with respect to FIG. 11.

Other variations are within the spirit of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. The term "connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. Use of the term "set" (e.g., "a set of items") or "subset," unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and corresponding set can be equal.

Conjunctive language, such as phrases of the form "at least one of A, B, and C," or "at least one of A, B, and C," unless specifically stated otherwise or otherwise clearly contradicted by context, is otherwise understood with the context as used in general to present that an item, term, etc., can be either A or B or C, or any nonempty subset of a set of A and B and C. For instance, in an illustrative example of a set having three members, conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). A plurality is at least two items but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In some embodiments, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In some embodiments, code is stored on a computer-readable storage medium, for example, in form of a computer program comprising a plurality of instructions executable by one or more processors. In some embodiments, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In some embodiments, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. A set of non-transitory computer-readable storage media, in some embodiments, comprises multiple non-transitory computer-readable storage media and one or more of individual non-transitory storage media of multiple non-transitory computer-readable storage media lacks all of the code while multiple non-transitory computer-readable storage media collectively store all of the code. In some embodiments, executable instructions are executed such that different instructions are executed by different processors—for example, a non-transitory computer-readable storage medium stores instructions, and a main central processing unit (CPU) executes some of the instructions while a graphics processing unit (GPU) executes other instructions. In some embodiments, different components of a computer system have separate processors, and different processors execute different subsets of instructions.

Accordingly, in some embodiments, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples or exemplary language (e.g., "such as") provided herein is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, can be used. It should be understood that these terms cannot be intended as synonyms for each other. Rather, in particular examples, "connected" or "coupled" can be used to indicate that two or more elements are in direct or indirect physical or electrical contact with each other. "Coupled" can also mean that two or more elements are not in direct contact with each other but yet still co-operate or interact with each other.

Unless specifically stated otherwise, it can be appreciated that throughout specification terms such as "processing," "computing," "calculating," "determining," or like, refer to action and/or processes of a computer or computing system or similar electronic computing device, that manipulates and/or transform data represented as physical, such as electronic, quantities within computing system's registers and/or memories into other data similarly represented as physical quantities within computing system's memories, registers or other such information storage, transmission or display devices.

In a similar manner, the term "processor" can refer to any device or portion of a device that processes electronic data from registers and/or memory and transform that electronic data into other electronic data that can be stored in registers and/or memory. As non-limiting examples, a "processor" can be a CPU or a GPU. A "computing platform" can comprise one or more processors. As used herein, "software" processes can include, for example, software and/or hardware entities that perform work over time, such as tasks, threads, and intelligent agents. Also, each process can refer to multiple processes for carrying out instructions in sequence or in parallel, continuously, or intermittently. The terms "system" and "method" are used herein interchangeably insofar as a system can embody one or more methods, and methods can be considered a system.

In the present document, references can be made to obtaining, acquiring, receiving, or inputting analog or digital data into a subsystem, computer system, or computer-implemented machine. Obtaining, acquiring, receiving, or inputting analog and digital data can be accomplished in a variety of ways, such as by receiving data as a parameter of a function call or a call to an application programming interface. In some implementations, the process of obtaining, acquiring, receiving, or inputting analog or digital data can be accomplished by transferring data via a serial or parallel interface. In another implementation, the process of obtaining, acquiring, receiving, or inputting analog or digital data can be accomplished by transferring data via a computer network from providing entity to acquiring entity. References can also be made to providing, outputting, transmitting, sending, or presenting analog or digital data. In various examples, the process of providing, outputting, transmitting, sending, or presenting analog or digital data can be accomplished by transferring data as an input or output parameter of a function call, a parameter of an application programming interface, or an interprocess communication mechanism.

Although the discussion above sets forth example implementations of described techniques, other architectures can be used to implement described functionality and are intended to be within the scope of this disclosure. Furthermore, although specific distributions of responsibilities are defined above for purposes of discussion, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A device comprising:

a plurality of communication lanes comprising a first portion of lanes and a second portion of lanes; and control logic coupled to the plurality of communication lanes, wherein the control logic to:

receive an indication that a first lane of the first portion of lanes is damaged;

determine a first index of the first lane of the first portion of lanes;

determine a second index of a second lane of the second portion of lanes responsive to the indication that the first lane of the first portion of lanes is damaged;

convert a first lane mapping of the plurality of communication lanes to a second lane mapping of the plurality of communication lanes based on the first index and the second index, wherein the second lane replaces the first lane in the second lane mapping such that a number of operational lanes in the second lane mapping is equal to a number of operational lanes in the first lane mapping, wherein to convert the first lane mapping to the second lane mapping, the control logic further to:

determine a third index of a third lane of the plurality of communication lanes, wherein the third lane is adjacent to the first lane, and wherein the third lane is adjacent to the second lane;

assign the first index to the third lane;

assign the third index to the second lane;

enable data transfer for the third lane at the first index;

enable data transfer for the second lane at the third index; and disable data transfer for the first lane; and cause first communication data to be transmitted via the plurality of communication lanes based on the second lane mapping.

2. The device of claim 1 further comprising a repair module coupled to the control logic, the control logic further to:

generate, at the repair module, a repair code comprising (i) the first index, (ii) the second index, and (iii) an indication of a damaged lane, responsive to determining that the first lane is damaged, wherein converting the first lane mapping to the second lane mapping is based on the repair code.

3. The device of claim 2, wherein converting the first lane mapping to the second lane mapping is based on a repair code comprising the first index and the second index, the control logic further to:

generate, at the repair module, a first portion of the repair code based on a plurality of fuses of the repair module, wherein fuses of the plurality of fuses are selectively burnt to generate burnt fuses representing the first index and the indication of the damaged lane; and generate, at the repair module, a second portion of the repair code based on the second index.

4. The device of claim 1 further comprising a repair module coupled to the control logic, wherein converting the first lane mapping to the second lane mapping is based on a repair code comprising the first index and the second index, the control logic further to: receive a signal comprising the repair code at the repair module.

5. The device of claim 1, the control logic further to:

determine an additional third index of an additional third lane of the first portion of lanes; and determine a fourth index of a fourth lane of the second portion of lanes, wherein converting the first lane mapping to the second lane mapping is further based on the additional third index and the fourth index.

6. The device of claim 5, wherein the first portion of lanes comprises a first set of lanes and a second set of lanes, wherein the first set of lanes comprises the first lane and is associated with the second lane, and wherein the second set of lanes comprises the additional third lane and is associated with the fourth lane.

7. A system for high-speed network communication, the system comprising:

one or more processing units; and a network interface coupled to the one or more processing units, wherein the network interface comprises a transmitter device coupled to a controller, wherein the transmitter device to transmit a data signal via a communication network, and wherein the controller to:

receive an indication that a first lane of a first portion of lanes of a plurality of communication lanes is damaged;

determine a first index of the first lane of the first portion of lanes;

determine a second index of a second lane of a second portion of lanes of the plurality of communication lanes responsive to the indication that the first lane of the first portion of lanes is damaged;

convert a first lane mapping of the plurality of communication lanes to a second lane mapping of the plurality of communication lanes based on the first index and the second index, wherein the second lane replaces the first lane in the second lane mapping such that a number of operational lanes in the second lane mapping is equal to a number of operational lanes in the first lane mapping, wherein to convert the first lane mapping to the second lane mapping, the controller further to:

determine a third index of a third lane of the plurality of communication lanes, wherein the third lane is adjacent to the first lane, and wherein the third lane is adjacent to the second lane;

assign the first index to the third lane;

assign the third index to the second lane;

enable data transfer for the third lane at the first index;

enable data transfer for the second lane at the third index; and disable data transfer for the first lane; and cause first communication data to be transmitted via the plurality of communication lanes by the transmitter device based on the second lane mapping.

8. The system of claim 7 further comprising a repair module coupled to the controller, the controller further to:

generate, at the repair module, a repair code comprising (i) the first index, (ii) the second index, and (iii) an indication of a damaged lane, responsive to determining that the first lane is damaged, wherein converting the first lane mapping to the second lane mapping is based on the repair code.

9. The system of claim 8, wherein converting the first lane mapping to the second lane mapping is based on the repair code comprising the first index and the second index, the controller further to:

generate, at the repair module, a first portion of the repair code based on a plurality of fuses of the repair module, wherein fuses of the plurality of fuses are selectively burnt to generate burnt fuses representing the first index and the indication of the damaged lane; and generate, at the repair module, a second portion of the repair code based on the second index.

10. The system of claim 8, wherein converting the first lane mapping to the second lane mapping is based on the repair code comprising the first index and the second index, the controller further to: receive a signal comprising the repair code at the repair module.

11. The system of claim 7, the controller further to:

determine an additional third index of an additional third lane of the first portion of lanes; and determine a fourth index of a fourth lane of the second portion of lanes, wherein converting the first lane mapping to the second lane mapping is further based on the additional third index and the fourth index.

12. The system of claim 11, wherein the first portion of lanes comprises a first set of lanes and a second set of lanes, wherein the first set of lanes comprises the first lane and is associated with the second lane, and wherein the second set of lanes comprises the additional third lane and is associated with the fourth lane.

13. A method comprising:
receiving an indication that a first lane of a plurality of communication lanes is damaged;
determining a first index of the first lane;
determining a second index of a second lane of the plurality of communication lanes responsive to the indication that the first lane is damaged;
converting a first lane mapping of the plurality of communication lanes to a second lane mapping of the plurality of communication lanes based on the first index and the second index, wherein the second lane replaces the first lane in the second lane mapping such that a number of operational lanes in the second lane mapping is equal to a number of operational lanes in the first lane mapping, wherein converting the first lane mapping to the second lane mapping comprises:
determining a third index of a third lane of the plurality of communication lanes, wherein the third lane is adjacent to the first lane, and wherein the third lane is adjacent to the second lane;
assigning the first index to the third lane;
assigning the third index to the second lane;
enabling data transfer for the third lane at the first index;
enabling data transfer for the second lane at the third index; and
disabling data transfer for the first lane; and
causing first communication data to be transmitted via the plurality of communication lanes based on the second lane mapping.

14. The method of claim 13, further comprising:
generating a repair code comprising (i) the first index, (ii) the second index, and (iii) an indication of a damaged lane, responsive to determining that the first lane is damaged, wherein converting the first lane mapping to the second lane mapping is based on the repair code.

15. The method of claim 14, wherein converting the first lane mapping to the second lane mapping is based on the repair code comprising the first index and the second index, the method further comprising:
generating a first portion of the repair code based on a plurality of fuses, wherein fuses of the plurality of fuses are selectively burnt to generate burnt fuses representing the first index and the indication of the damaged lane; and
generating a second portion of the repair code based on the second index.

16. The method of claim 13, wherein converting the first lane mapping to the second lane mapping is based on a repair code comprising the first index and the second index, the method further comprising: receiving a signal comprising the repair code.

17. The method of claim 13, wherein the plurality of communication lanes comprises a first set of lanes and a second set of lanes, wherein the first set of lanes comprises the first lane and is associated with the second lane, and wherein the second set of lanes comprises the third lane and is associated with a fourth lane.

* * * * *